(12) United States Patent
Dowaki et al.

(10) Patent No.: US 11,066,612 B1
(45) Date of Patent: Jul. 20, 2021

(54) BIOMASS GASIFICATION DEVICE

(71) Applicant: Japan Blue Energy Co., Ltd., Tokyo (JP)

(72) Inventors: Naoki Dowaki, Tokyo (JP); Hisashi Kamiuchi, Tokyo (JP); Mitsuo Kameyama, Tokyo (JP)

(73) Assignee: JAPAN BLUE ENERGY CO., LTD., Tokyo (JP)

( * ) Notice: Subject to any disclaimer, the term of this patent is extended or adjusted under 35 U.S.C. 154(b) by 0 days.

(21) Appl. No.: 16/650,683

(22) PCT Filed: Sep. 27, 2018

(86) PCT No.: PCT/JP2018/035966
§ 371 (c)(1),
(2) Date: Mar. 25, 2020

(87) PCT Pub. No.: WO2019/065851
PCT Pub. Date: Apr. 4, 2019

(30) Foreign Application Priority Data

Sep. 29, 2017 (JP) .............................. JP2017-191607

(51) Int. Cl.
*C10J 3/12* (2006.01)
*C10J 3/22* (2006.01)
*C10K 3/00* (2006.01)

(52) U.S. Cl.
CPC . *C10J 3/12* (2013.01); *C10J 3/22* (2013.01); *C10K 3/005* (2013.01); *C10K 3/006* (2013.01);
(Continued)

(58) Field of Classification Search
CPC ... C10J 3/12; C10J 3/22; C10J 2200/09; C10J 2300/0916; C10J 2300/0976;
(Continued)

(56) References Cited

U.S. PATENT DOCUMENTS 2,912,315 A * 11/1959 Haney ....................... C01B 3/30
48/214 R
3,891,402 A * 6/1975 Nahas ......................... C10J 3/54
48/197 R
(Continued)

FOREIGN PATENT DOCUMENTS

JP 2002-210444 A 7/2002
JP 2002-322902 A 11/2002
(Continued)

OTHER PUBLICATIONS

International Search Report dated Nov. 27, 2018, issued in counterpart International Application No. PCT/JP2018/035966 (2 pages).

*Primary Examiner* — Matthew J Merkling
(74) *Attorney, Agent, or Firm* — Westerman, Hattori, Daniels & Adrian, LLP

(57) ABSTRACT

The present invention provides a biomass gasification device that optimizes the pyrolysis temperature of biomass, the reforming temperature of pyrolysis gas, and the atmosphere thereof to generate a reformed gas containing a large amount of valuable gas. The present invention related to a biomass gasification device that is provided with a biomass pyrolyzer, a pyrolysis gas reformer, and a pyrolysis gas introduction pipe, wherein: the biomass pyrolyzer is further provided with a heat carrier inlet and outlet ports, and performs pyrolysis on the biomass by heat of the heat carrier; the pyrolysis gas reformer performs steam-reforming on pyrolysis gas generated by the pyrolysis of biomass; the pyrolysis gas reformer is further provided with an air or oxygen blow-in port; and the pyrolysis gas introduction pipe is provided on the biomass pyrolyzer-side surface below the upper surface of the heat carrier layer formed in the biomass pyrolyzer.

13 Claims, 5 Drawing Sheets

(52) U.S. Cl.
CPC .... *C10J 2200/09* (2013.01); *C10J 2300/0916* (2013.01); *C10J 2300/0976* (2013.01); *C10J 2300/0993* (2013.01); *C10J 2300/164* (2013.01)

(58) Field of Classification Search
CPC ........ C10J 2300/0993; C10J 2300/164; C10K 3/005; C10K 3/006
See application file for complete search history.

(56) References Cited

U.S. PATENT DOCUMENTS

| | | | | |
|---|---|---|---|---|
| 3,957,459 | A | * | 5/1976 | Mitchell ..................... C10J 3/56 48/197 R |
| 3,985,519 | A | * | 10/1976 | Kalina ........................ C10J 3/54 48/202 |
| 4,211,606 | A | * | 7/1980 | Ponomarev ............. C10B 49/20 201/12 |
| 4,391,612 | A | * | 7/1983 | Chang ...................... C10J 3/526 48/202 |
| 4,704,138 | A | * | 11/1987 | Smith ........................ C10J 3/12 201/12 |
| 8,100,991 | B2 | * | 1/2012 | Sasauchi .................... C10J 3/84 48/61 |
| 8,480,767 | B2 | * | 7/2013 | Matsuzawa ................ C10J 3/56 48/61 |
| 2004/0060236 | A1 | | 4/2004 | Yoshikawa et al. |
| 2005/0247553 | A1 | * | 11/2005 | Ichikawa ............... C10K 3/006 202/96 |
| 2012/0097517 | A1 | | 4/2012 | Hustache et al. |
| 2013/0165534 | A1 | * | 6/2013 | McComish .............. C10G 2/32 518/702 |
| 2015/0135594 | A1 | | 5/2015 | Dowaki et al. |

FOREIGN PATENT DOCUMENTS

| | | |
|---|---|---|
| JP | 2004-51745 A | 2/2004 |
| JP | 4155507 B2 | 9/2008 |
| JP | 4264525 B2 | 5/2009 |
| JP | 2011-144329 A | 7/2011 |
| JP | 2012-528222 A | 11/2012 |
| JP | 2015-178578 A | 10/2015 |
| WO | 2013/172301 A1 | 11/2013 |
| WO | 2017/203587 A1 | 11/2017 |

* cited by examiner

BIOMASS GASIFICATION DEVICE

TECHNICAL FIELD

The present invention relates to a biomass gasification device, in particular, a biomass gasification device having a biomass pyrolytic reactor for pyrolyzing biomass or preferably biomass having relatively high ash content and a pyrolyzed gas reforming reactor for mixing pyrolyzed gas generated in the biomass pyrolytic reactor with oxygen or air and steam, and partially combusting and reforming the mixed gas.

BACKGROUND ART

After the Great East Japan Earthquake on Mar. 11, 2011, renewable energy and distributed energy supply facilities have been reconsidered, and the renewable energy plants using photovoltaic power generation, wind power generation, geothermal power generation, hydroelectric power generation, tidal power generation, and biomass power generation have been focused. In recent years, hydrogen production by water electrolysis using electric power generated with renewable energy has been focused.

Among renewable energy, the photovoltaic power generation, wind power generation, and tidal power generation are expected to be temporary power supplies, but cannot be stable power supplies because of its unstable generation. A small-scale plant of the hydroelectric power generation or tidal power generation is in some demand, and vacant lot can be easily secured for small-scale plants, whereas a large-scale plant can be built at only limited sites.

On the other hand, biomasses such as wood, sewage sludge and domestic animal excretion exist uniformly in Japan. Above all, since sewage sludge and domestic animal excretion are continuously generated with little variation due to seasons, they are considered as a stable biomass raw material. In particular, about 2.15 million tons of sewage sludge is generated per year (based on dry weight; the amount generated in 2015; from data of the Ministry of Land, Infrastructure, Transport and Tourism), 75% by weight of it being unused, and is expected to be used effectively.

However, since sewage sludge contains nitrogen, phosphorus, potassium and other inorganic substances, as well as soil and the like derived from rainwater, it has high ash content and is difficult to burn. In addition, since it has a low calorific value, incineration efficiency is low when incineration, which is a disadvantage. Also, it generates $N_2O$ derived from nitrogen in it during combustion. The global warming potential of $N_2O$ is 298 times greater than that of $CO_2$ (the global warming potential of $N_2O$ has been altered from 310 times to 298 time greater than that of $CO_2$ since 2013; from a document by Ministry of the Environment), and combustion at high temperature of 850° C. or higher is required to inhibit generation of $N_2O$. On the other hand, phosphorus is converted to diphosphorus pentoxide by combustion. It is known that diphosphorus pentoxide has a high sublimation property and also has a deliquescent property, and thus causes clogging effect in a low-temperature portion of a pipe. In addition to diphosphorus pentoxide, it is also known that potassium promotes clogging and corrosion of a pipe. Therefore, in combustion of sewage sludge, combustion or heat treatment have to be performed under a condition to inhibit generation of $N_2O$ and diphosphorus pentoxide and to inhibit volatilization of diphosphorus pentoxide and potassium.

For a high-ash-content biomass gasification device, for example, a method has been proposed that sewage sludge having an ash content of 20% by weight is dried and then pyrolyzed at 500 to 800° C. in a fluidized bed pyrolysis furnace of an air blowing-in type, and the resultant pyrolyzed gas is combusted with air at high temperature of 1,000° C. to 1,250° C. to generate steam for turbine power generation by the heat (Patent Document 1). Patent Document 1 describes that this method can achieve efficient separation of ash in sewage sludge and at the same time effectively utilize heat for drying sewage sludge and for power generation. However, in this method, since air is blown into the fluidized bed pyrolysis furnace, the calorific value of the pyrolyzed gas and thus thermal efficiency is reduced. Therefore, a high output power generation cannot be expected. Furthermore, the method generates electric power and cannot produce valuable gases such as methane gas and hydrogen gas. In addition, since the method uses the fluidized bed pyrolysis furnace, generated ash cannot be separated from a flowing medium. Therefore, sticking of the flowing medium is caused by diphosphorus pentoxide and potassium so that the flowing state becomes unstable. As a result, the flowing medium has to be frequently replaced, and thus, a problem such as a failure to perform stable continuous operation is assumed.

A method has been proposed that high-ash-content biomass as a raw material is pyrolyzed at a temperature of 450° C. to 850° C. in a circulation fluidized bed pyrolysis furnace of an air blowing-in type to collect char as a pyrolysis residue by cyclonic separation while a pyrolyzed gas containing tar is reformed at 1,000° C. to 1,200° C. in presence of oxygen (Patent Document 2). This method can modify the pyrolyzed gas at high temperature in oxygen so as to obtain a clean combustible gas from which tar has been removed. However, in this method, the char separated and collected by the cyclonic separation is returned to the circulation fluidized bed furnace. Therefore, a problem is expected that the flowing state should become unstable due to sticking as in Patent Document 1 of diphosphorus pentoxide and potassium in ash to a flowing medium, for example. In addition, the pyrolyzed gas reformed in oxygen contains a large amount of carbon monoxide so that it has a low calorific value and rarely contains valuable gases such as methane and hydrogen, which is a problem. Also, a method has been proposed that, in order to prevent sticking of the flowing medium, pyrolyzation and separation of char are performed by the same way as the above, then the char is granulated and supplied into a circulation fluidized bed reforming furnace, and the char is sintered at a temperature of 900° C. to 1000° C. to produce a granulated sintered body (Patent Document 3). This method has an advantage that sticking of diphosphorus pentoxide and potassium to the flowing medium can be prevented while a granulated aggregate can be produced as a by-product. However, also in this method, the pyrolyzed gas contains a large amount of carbon monoxide so that it has a low calorific value and rarely contains valuable gases such as methane and hydrogen, which is a problem.

A typical method of gasifying organic materials such as woody biomass uses heat carriers. For example, a device has been disclosed, the device having: a plurality of heat carriers, e.g., alumina spheres (having a diameter of 10 mm) for carrying heat; a preheater for heating the heat carriers; a reforming reactor for steam reforming of a pyrolyzed gas; a pyrolytic reactor for pyrolyzing a woody biomass raw material; a separator for separating the heat carriers and char; and a hot blast stove for combusting the char and generating a hot blast, and the preheater, the reforming reactor, and the pyrolytic reactor being vertically arranged in this order from top to bottom (Patent Document 5). In this device: the heat carriers are preheated to a high temperature in the preheater and then successively dropped into the reforming reactor and the pyrolytic reactor, in the reforming reactor, the pyrolyzed gas generated in the pyrolytic reactor is brought into direct contact with the heat carriers and is thereby reformed for achieving reduction of tar content and increase of hydrogen concentration in the gas; and then, in the pyrolytic reactor, the biomass is brought into direct contact with the heat carriers and is thereby pyrolyzed to generate the pyrolyzed gas. As described above, the heat carriers are dropped due to gravity and the reaction proceeds successively. However, since the preheater, the reforming reactor, and the pyrolytic reactor are vertically arranged in this order from top to bottom, the overall height of the device is significantly increased, which is a problem. For example, in order to process 1 ton (based on dry weight) of woody chips per day as biomass, the height of the device reaches as high as about 23 m, and about 1,320 kg of the heat carriers are used in the preheater, about 1,320 kg in the reforming reactor, and about 1,000 kg in the pyrolytic reactor. Therefore, the device becomes large-scale.

To solve the aforementioned problem that the height and scale of the device is increased too much, a device has been proposed which has a pyrolytic reactor in a pyrolyzing zone and a reforming reactor in a reacting zone individually as basic components for allowing both a serial-connection configuration and a parallel-connection configuration. For example, a method of producing high-calorie gas from an organic material or organic-material-containing mixture has been known (Patent Document 4). The heat carriers circulate through a heating zone at about 1,100° C., a reacting zone at 950° C. to 1,000° C., a pyrolyzing zone at 550° C. to 650° C., a separating zone, and the heating zone again. During the circulation, the organic material or organic-material-containing mixture comes into contact with the heat carriers heated in the pyrolyzing zone and is separated into a solid carbon-containing residue and pyrolyzed gas as a gas phase. After the heat carriers pass through the pyrolyzing zone, the solid carbon-containing residue is separated from the heat carriers through the separating operation. The pyrolyzed gas is mixed with steam serving as a reaction medium, acquires part of the heat of the heat carriers heated in the reacting zone, and thus is further heated, to produce high-calorie gas. The pyrolyzed gas is mixed with steam in the pyrolyzing zone, all the solid carbon-containing residue is transported to another combustion device and is combusted in the combustion device, and hot exhaust gas from the combustion device passes through the heat carriers accumulated in the heating zone such that most of the sensible heat is transferred to the heat carriers. In this method, the mixture is separated into the pyrolytic coke and the heat carriers immediately after exiting a pyrolytic reactor, the resulting pyrolytic coke is combusted in the combustion device, and the sensible heat generated by the combustion is used for heating the heat carriers in the heating zone. The method thus can produce high-calorie gas at low costs. Also, this method has an advantage that pyrolysis is performed without air being blown into so that reformed gas containing a large amount of valuable gas such as methane and hydrogen can be obtained. Furthermore, the method has an advantage that pyrolyzed coke (char) is efficiently separated and collected to further reuse it as a heat source, so that it can achieve high thermal efficiency. In addition, even when biomass having a high ash content and a high nitrogen content such as sewage sludge is used as a raw material, this method is expected to inhibit generation of diphosphorus pentoxide while inhibiting generation of $N_2O$ in pyrolysis. However, in this method, the pyrolyzed gas generated in the pyrolyzing zone, i.e., the pyrolytic reactor, was introduced from an upper part of the pyrolytic reactor into a lower part of the reacting zone, i.e., the pyrolyzed gas reforming reactor through a pipe. In this way of introducing the pyrolyzed gas into the reforming reactor, there was a problem that tar, soot, and the like adhered to an inner wall of the pipe, valves, and the like which the pyrolyzed gas passed through, which caused inevitable clogging troubles. In addition, when the pyrolyzed coke (char) is combusted, phosphorus, potassium, and the like concentrated in the pyrolyzed coke (char) are scattered as oxides, which deposit in a combustion device and in a pipe downstream of the combustion device and absorb moisture to exhibit a deliquescent effect. Thus, there is a concern that the pipe is clogged, the pipe is damaged due to alkali corrosion, and the like. Therefore, the pyrolyzed coke (char) cannot be combusted when high-ash-content biomass is used as a raw material, which is a disadvantage. At the same time, the char obtained by pyrolysis of the high-ash-content biomass has even higher ash content due to concentration of ash therein, and thus the char is not suitable for combustion. Therefore, the aforementioned process itself is difficult to be embodied, which is a disadvantage.

CITATION LIST

Patent Literatures

Patent Document 1: Japanese Unexamined Patent Application Publication No. 2002-322902

Patent Document 2: Japanese Unexamined Patent Application Publication No. 2004-51745

Patent Document 3: Japanese Granted Patent Publication No. 4155507

Patent Document 4: Japanese Granted Patent Publication No. 4264525

Patent Document 5: Japanese Unexamined Patent Application Publication No. 2011-144329

SUMMARY OF INVENTION

Technical Problem

An object of the present invention is to provide a biomass gasification device which can optimize a pyrolysis temperature of a biomass, preferably biomass having relatively high ash content, a reforming temperature of the resulting pyrolyzed gas, and an atmosphere in pyrolysis and reforming, so as to: generate a reformed gas having a high content of variable gas such as hydrogen; prevent plugging and corrosion of a pipe caused by volatilization of diphosphorus pentoxide and potassium contained in ash in the biomass; inhibit generation of $N_2O$; and reduce generation quantities of tar and soot.

Solution to Problems

The present inventors have conducted various studies in order to solve the problems of the prior art, and as a result, have reached the following idea. That is, if the temperatures of the biomass pyrolytic reactor and the pyrolyzed gas reforming reactor can be separately controlled, the pyrolysis temperature of the biomass and the reforming temperature of the pyrolyzed gas can be respectively optimized so that the generation of tar and soot in pyrolysis of the biomass as well as volatilization of diphosphorus pentoxide and potassium can be inhibited, and that generation of $N_2O$ can be inhibited in the reforming reactor. However, in the device configuration as described in Patent Document 4, the temperatures of the biomass pyrolytic reactor and the pyrolyzed gas reforming reactor can be separately controlled, but in a pyrolyzed gas introducing pipe for introducing the pyrolyzed gas from the biomass pyrolytic reactor to the pyrolyzed gas reforming reactor, tar, soot and, the like adhere to an inner wall, valves and the like, resulting in troubles of plugging in the pyrolyzed gas introducing pipe.

Then, the present inventors attempted various studies about what configuration of the gasification device should be made for separately controlling internal temperatures of the biomass pyrolytic reactor and the pyrolyzed gas reforming reactor in order to optimize the pyrolysis temperature of the biomass and the reforming temperature of the pyrolyzed gas so as to reduce the generation of tar and soot, volatilization of diphosphorus pentoxide and potassium, as well as generation of $N_2O$; and to avoid adhesion of tar and soot to the inner wall of the pyrolyzed gas introducing pipe for introducing the pyrolyzed gas generated in the biomass pyrolytic reactor into the pyrolyzed gas reforming reactor, resulting in plugging of the pyrolyzed gas introducing pipe.

As a result, the present inventors have found that the problem that tar, soot, and the like adhere to the inner wall of the pyrolyzed gas introducing pipe and the pyrolyzed gas introducing pipe is plugged can be solved by: on a biomass pyrolytic reactor side, mounting the pyrolyzed gas introducing pipe introducing the pyrolyzed gas from the biomass pyrolytic reactor to the pyrolyzed gas reforming reactor on a side surface of the biomass pyrolytic reactor at a level below an upper surface of a layer of a plurality of preheated granules and/or lumps (heat carriers) formed in the biomass pyrolytic reactor; and preferably, arranging the pyrolyzed gas introducing pipe horizontally. In other words, the present inventors have found that, when a gas intake port (gas inlet) of the pyrolyzed gas introducing pipe is provided in the heat carrier layer to introduce the heat carriers in the biomass pyrolytic reactor to the pyrolyzed gas introducing pipe and to allow the pyrolyzed gas to pass through the heat carrier layer held in the pyrolyzed gas introducing pipe, tar, soot, and the like are efficiently removed and tar is effectively pyrolyzed. In addition, the present inventors have surprisingly found that the heat carriers entering the pyrolyzed gas introducing pipe are sequentially replaced due to movement of the heat carriers from top to bottom in the biomass pyrolytic reactor, and thus, tar, soot, and the like are remarkably efficiently removed and tar is pyrolyzed or preferably reformed without deposition and plugging of the heat carriers in the pyrolyzed gas introducing pipe due to tar and the like. In addition, the present inventors have found that, when the inner bottom face of the pyrolyzed gas introducing pipe is preferably made to protrude upward, the heat carriers flowing through the biomass pyrolytic reactor can be more effectively prevented from flowing into the other reactor, i.e., the pyrolyzed gas reforming reactor through the pyrolyzed gas introducing pipe, and the heat carriers in the pyrolyzed gas introducing pipe are effectively replaced so that tar, soot and, the like can be more efficiently removed. Furthermore, the present inventors have found that, when heating by the heat carrier is used only for pyrolysis of the biomass in the pyrolytic reactor, and heat is generated by partial oxidization of the pyrolyzed gas by using oxygen or air together with steam so as to reform the pyrolyzed gas in the pyrolyzed gas reforming reactor by using steam, the internal temperature of the pyrolyzed gas reforming reactor can be controlled separately from the biomass pyrolytic reactor: and by suitably controlling supplied amounts of steam and oxygen or air, methane, carbon monoxide, tar, and the like in the pyrolyzed gas can be remarkably efficiently reformed so that an amount of tar in generated gas, i.e., reformed gas can be remarkably reduced and a concentration of hydrogen can be remarkably increased.

Accordingly, the present invention provides:

(1) A biomass gasification device, having:

a biomass pyrolytic reactor having a biomass inlet and a non-oxidizing gas inlet and/or a steam inlet;

a pyrolyzed gas reforming reactor having a steam inlet and a reformed gas outlet;

a pyrolyzed gas introducing pipe for introducing a pyrolyzed gas generated in the biomass pyrolytic reactor into the pyrolyzed gas reforming reactor, the pyrolyzed gas introducing pipe being provided between the biomass pyrolytic reactor and the pyrolyzed gas reforming reactor, wherein:

the biomass pyrolytic reactor further has an introduction port and a discharge port for a plurality of preheated granules and/or lumps, and performs pyrolysis of biomass by using heat of the plurality of granules and/or lumps; and the pyrolyzed gas reforming reactor performs steam reforming of the pyrolyzed gas generated by the pyrolysis of the biomass, the biomass gasification device being characterized in that:

the pyrolyzed gas reforming reactor further has an air or oxygen inlet, and performs the steam reforming by partially combusting the pyrolyzed gas generated by the pyrolysis of the biomass by using air or oxygen; and the pyrolyzed gas introducing pipe is provided on a side surface of the biomass pyrolytic reactor at a level below an upper surface of a layer of the plurality of granules and/or lumps formed in the biomass pyrolytic reactor.

The preferred aspects can include:

(2) The biomass gasification device according to the aspect (1), wherein the pyrolyzed gas introducing pipe is provided between the biomass pyrolytic reactor and the pyrolyzed gas reforming reactor to be substantially horizontal with respect to a gravity direction;

(3) The biomass gasification device according to the aspect (1) or (2), wherein an inner bottom face of the pyrolyzed gas introducing pipe has a configuration protruding upward;

(4) The biomass gasification device according to the aspect (1) or (2), wherein the inner bottom face of the pyrolyzed gas introducing pipe has a configuration protruding upward with an inclination from a biomass pyrolytic reactor side to a pyrolyzed gas reforming reactor side;

(5) The biomass gasification device according to the aspect (1) or (2), wherein the inner bottom face of the pyrolyzed gas introducing pipe has a configuration protruding upward with an inclination of 5 to 45 degrees from a biomass pyrolytic reactor side to a pyrolyzed gas reforming reactor side;

(6) The biomass gasification device according to the aspect (1) or (2), wherein the inner bottom face of the pyrolyzed gas introducing pipe has a configuration protruding upward with an inclination of 10 to 30 degrees from a biomass pyrolytic reactor side to a pyrolyzed gas reforming reactor side;

(7) The biomass gasification device according to the aspect (1) or (2), wherein the inner bottom face of the pyrolyzed gas introducing pipe has a configuration protruding upward with an inclination of 15 to 25 degrees from a biomass pyrolytic reactor side to a pyrolyzed gas reforming reactor side;

(8) The biomass gasification device according to any one of the aspects (1) to (7), wherein an inner shape of a cross section perpendicular to a longitudinal direction of the pyrolyzed gas introducing pipe (a flow direction of the pyrolyzed gas) is substantially circular or substantially polygonal;

(9) The biomass gasification device according to any one of the aspects (1) to (7), wherein the inner shape of the cross section perpendicular to the longitudinal direction of the pyrolyzed gas introducing pipe (the flow direction of the pyrolyzed gas) is substantially rectangular;

(10) The biomass gasification device according to any one of the aspects (1) to (9), wherein one to three pyrolyzed gas introducing pipes are provided;

(11) The biomass gasification device according to any one of the aspects (1) to (9), wherein one or two pyrolyzed gas introducing pipes are provided;

(12) The biomass gasification device according to any one of the aspects (1) to (11), wherein the pyrolyzed gas introducing pipe holds the plurality of granules and/or lumps in its inside;

(13) The biomass gasification device according to any one of the aspects (1) to (12), wherein the steam inlet is provided on at least one position selected from a group consisting of: the biomass pyrolytic reactor and its vicinity; the pyrolyzed gas reforming reactor and its vicinity; and the pyrolyzed gas introducing pipe;

(14) The biomass gasification device according to any one of the aspects (1) to (12), wherein the steam inlet is provided on: the biomass pyrolytic reactor or its vicinity; the pyrolyzed gas reforming reactor or its vicinity; and the pyrolyzed gas introducing pipe;

(15) The biomass gasification device according to any one of the aspects (1) to (12), wherein one to three steam inlets are provided on each of: the biomass pyrolytic reactor or its vicinity; the pyrolyzed gas reforming reactor or its vicinity; and the pyrolyzed gas introducing pipe:

(16) The biomass gasification device according to any one of the aspects (1) to (12), wherein one steam inlet is provided on each of: the biomass pyrolytic reactor or its vicinity; the pyrolyzed gas reforming reactor or its vicinity; and the pyrolyzed gas introducing pipe;

(17) The biomass gasification device according to any one of the aspects (1) to (16), wherein the air or oxygen inlet is provided on at least one position selected from a group consisting of: the pyrolyzed gas reforming reactor and its vicinity; and the pyrolyzed gas introducing pipe;

(18) The biomass gasification device according to any one of the aspects (1) to (16), wherein the air or oxygen inlet is provided on: the pyrolyzed gas reforming reactor or its vicinity; and the pyrolyzed gas introducing pipe;

(19) The biomass gasification device according to any one of the aspects (1) to (16), wherein one to three air or oxygen inlets are provided on each of: the pyrolyzed gas reforming reactor or its vicinity; and the pyrolyzed gas introducing pipe;

(20) The biomass gasification device according to any one of the aspects (1) to (16), wherein one air or oxygen inlet are provided on each of: the pyrolyzed gas reforming reactor or its vicinity; and the pyrolyzed gas introducing pipe;

(21) The biomass gasification device according to any one of the aspects (1) to (20), wherein a preheater for preheating the plurality of granules and/or lumps is further provided above the biomass pyrolytic reactor;

(22) The biomass gasification device according to any one of the aspects (1) to (21), wherein the introduction port for the plurality of granules and/or lumps is provided on an upper portion of the biomass pyrolytic reactor;

(23) The biomass gasification device according to any one of the aspects (1) to (21), wherein the introduction port for the plurality of granules and/or lumps is provided on a top portion of the biomass pyrolytic reactor;

(24) The biomass gasification device according to any one of the aspects (1) to (23), wherein the discharge port for the plurality of granules and/or lumps is provided on a lower portion of the biomass pyrolytic reactor;

(25) The biomass gasification device according to any one of the aspects (1) to (23), wherein the discharge port for the plurality of granules and/or lumps is provided on a bottom portion of the biomass pyrolytic reactor;

(26) The biomass gasification device according to any one of the aspects (1) to (25), wherein the pyrolyzed gas reforming reactor does not have a heater;

(27) The biomass gasification device according to any one of the aspects (1) to (26), wherein the granules and/or lumps are selected from a group consisting of metal spheres and ceramic spheres;

(28) The biomass gasification device according to the aspect (27), wherein the metal spheres are composed of stainless steel;

(29) The biomass gasification device according to the aspect (27), wherein the ceramic spheres are composed a material selected from a group consisting of alumina, silica, silicon carbide, tungsten carbide, zirconia, and silicon nitride;

(30) The biomass gasification device according to any one of the aspects (1) to (29), wherein a gas-phase temperature in the biomass pyrolytic reactor is 400° C. to 700° C.;

(31) The biomass gasification device according to any one of the aspects (1) to (29), wherein the gas-phase temperature in the biomass pyrolytic reactor is 500° C. to 700° C.;

(32) The biomass gasification device according to any one of the aspects (1) to (29), wherein the gas-phase temperature in the biomass pyrolytic reactor is 550° C. to 650° C.;

(33) The biomass gasification device according to any one of the aspects (1) to (32), wherein a gas-phase temperature in the pyrolyzed gas reforming reactor is 700° C. to 1000° C.:

(34) The biomass gasification device according to any one of the aspects (1) to (32), wherein the gas-phase temperature in the pyrolyzed gas reforming reactor is 850° C. to 950° C.;

(35) The biomass gasification device according to any one of the aspects (1) to (32), wherein the gas-phase temperature in the pyrolyzed gas reforming reactor is 880° C. to 930° C.;

(36) The biomass gasification device according to any one of the aspects (1) to (35), wherein the biomass is a high-ash-content biomass having an ash content of 5.0% by mass or more based on dry weight;

(37) The biomass gasification device according to any one of the aspects (1) to (35), wherein the biomass is a high-ash-content biomass having an ash content of 10.0% by mass to 30.0% by mass based on dry weight;

(38) The biomass gasification device according to any one of the aspects (1) to (35), wherein the biomass is a high-ash-content biomass having an ash content of 15.0% by mass to 20.0% by mass based on dry weight:

(39) The biomass gasification device according to any one of the aspects (1) to (38), wherein the biomass is selected from a group consisting of plant biomass, biological biomass, domestic waste, and food waste; and

(40) The biomass gasification device according to any one of the aspects (1) to (38), wherein the biomass is selected from a group consisting of sewage sludge and domestic animal excretion.

In addition, the present invention provides a method of gasifying biomass by using the biomass gasification device according to (1) described above. That is, the present invention provides:

(41) A method of gasifying biomass, wherein:
a biomass gasification device has:
a biomass pyrolytic reactor for heating the biomass under a non-oxidizing gas atmosphere or under a mixed gas atmosphere of a non-oxidizing gas and steam; and
a pyrolyzed gas reforming reactor for reforming a gas generated in the biomass pyrolytic reactor in presence of steam,
the method includes:
putting a plurality of preheated granules and/or lumps into the biomass pyrolytic reactor so as to perform pyrolysis of biomass by using heat of the plurality of granules and/or lumps; and
then introducing the pyrolyzed gas generated by the pyrolysis of the biomass into the pyrolyzed gas reforming reactor so as to perform steam reforming of the pyrolyzed gas,
and wherein:
the pyrolyzed gas generated by the pyrolysis of the biomass is introduced into the pyrolyzed gas reforming reactor through a pyrolyzed gas introducing pipe provided on a side surface at a level below an upper surface of a layer of the plurality of granules and/or lumps formed in the biomass pyrolytic reactor; and
then the introduced pyrolyzed gas is partially oxidized by air or oxygen which is separately introduced into the pyrolyzed gas reforming reactor, and at the same time, is reformed by steam which is simultaneously introduced with the air or oxygen.

The preferred aspects can include:

(42) The biomass gasification method according to the aspect (41), wherein the pyrolyzed gas introducing pipe is provided between the biomass pyrolytic reactor and the pyrolyzed gas reforming reactor to be substantially horizontal with respect to a gravity direction;

(43) The biomass gasification method according to the aspect (41) or (42), wherein an inner bottom face of the pyrolyzed gas introducing pipe has a configuration protruding upward;

(44) The biomass gasification method according to the aspect (41) or (42), wherein the inner bottom face of the pyrolyzed gas introducing pipe has a configuration protruding upward with an inclination from a biomass pyrolytic reactor side to a pyrolyzed gas reforming reactor side;

(45) The biomass gasification method according to the aspect (41) or (42), wherein the inner bottom face of the pyrolyzed gas introducing pipe has a configuration protruding upward with an inclination of 5 to 45 degrees from a biomass pyrolytic reactor side to a pyrolyzed gas reforming reactor side;

(46) The biomass gasification method according to the aspect (41) or (42), wherein the inner bottom face of the pyrolyzed gas introducing pipe has a configuration protruding upward with an inclination of 10 to 30 degrees from a biomass pyrolytic reactor side to a pyrolyzed gas reforming reactor side;

(47) The biomass gasification method according to the aspect (41) or (42), wherein the inner bottom face of the pyrolyzed gas introducing pipe has a configuration protruding upward with an inclination of 15 to 25 degrees from a biomass pyrolytic reactor side to a pyrolyzed gas reforming reactor side;

(48) The biomass gasification method according to any one of the aspects (41) to (47), wherein an inner shape of a cross section perpendicular to a longitudinal direction of the pyrolyzed gas introducing pipe (a flow direction of the pyrolyzed gas) is substantially circular or substantially polygonal;

(49) The biomass gasification method according to any one of the aspects (41) to (47), wherein the inner shape of the cross section perpendicular to the longitudinal direction of the pyrolyzed gas introducing pipe (the flow direction of the pyrolyzed gas) is substantially rectangular;

(50) The biomass gasification method according to any one of the aspects (41) to (49), wherein one to three pyrolyzed gas introducing pipes are provided;

(51) The biomass gasification method according to any one of the aspects (41) to (49), wherein one or two pyrolyzed gas introducing pipes are provided:

(52) The biomass gasification method according to any one of the aspects (41) to (51), wherein the pyrolyzed gas introducing pipe holds the plurality of granules and/or lumps in its inside;

(53) The biomass gasification method according to any one of the aspects (41) to (52), wherein the steam inlet is provided on at least one position selected from a group consisting of: the biomass pyrolytic reactor and its vicinity; the pyrolyzed gas reforming reactor and its vicinity; and the pyrolyzed gas introducing pipe;

(54) The biomass gasification method according to any one of the aspects (41) to (52), wherein the steam inlet is provided on: the biomass pyrolytic reactor or its vicinity; the pyrolyzed gas reforming reactor or its vicinity; and the pyrolyzed gas introducing pipe;

(55) The biomass gasification method according to any one of the aspects (41) to (52), wherein one to three steam inlets are provided on each of: the biomass pyrolytic reactor or its vicinity; the pyrolyzed gas reforming reactor or its vicinity; and the pyrolyzed gas introducing pipe:

(56) The biomass gasification method according to any one of the aspects (41) to (52), wherein one steam inlet is provided on each of: the biomass pyrolytic reactor or its vicinity; the pyrolyzed gas reforming reactor or its vicinity; and the pyrolyzed gas introducing pipe;

(57) The biomass gasification method according to any one of the aspects (41) to (52), wherein the air or oxygen inlet is provided on at least one position selected from a group consisting of: the pyrolyzed gas reforming reactor and its vicinity; and the pyrolyzed gas introducing pipe;

(58) The biomass gasification method according to any one of the aspects (41) to (52), wherein the air or oxygen inlet is provided on: the pyrolyzed gas reforming reactor or its vicinity, and the pyrolyzed gas introducing pipe;

(59) The biomass gasification method according to any one of the aspects (41) to (52), wherein one to three air or oxygen inlet are provided on each of: the pyrolyzed gas reforming reactor or its vicinity; and the pyrolyzed gas introducing pipe;

(60) The biomass gasification method according to any one of the aspects (41) to (52), wherein one air or oxygen inlet are provided on each of: the pyrolyzed gas reforming reactor or its vicinity: and the pyrolyzed gas introducing pipe;

(61) The biomass gasification method according to any one of the aspects (41) to (60), wherein a preheater for preheating the plurality of granules and/or lumps is further provided above the biomass pyrolytic reactor;

(62) The biomass gasification method according to any one of the aspects (41) to (60), wherein the introduction port for the plurality of granules and/or lumps is provided on an upper portion of the biomass pyrolytic reactor;

(63) The biomass gasification method according to any one of the aspects (41) to (60), wherein the introduction port for the plurality of granules and/or lumps is provided on a top portion of the biomass pyrolytic reactor;

(64) The biomass gasification method according to any one of the aspects (41) to (63), wherein the discharge port for the plurality of granules and/or lumps is provided on a lower portion of the biomass pyrolytic reactor;

(65) The biomass gasification method according to any one of the aspects (41) to (63), wherein the discharge port for the plurality of granules and/or lumps is provided on a bottom portion of the biomass pyrolytic reactor;

(66) The biomass gasification method according to any one of the aspects (41) to (65), wherein, in the pyrolyzed gas reforming reactor, steam reforming of the pyrolyzed gas generated by pyrolysis of the biomass is performed only by using heat of the pyrolyzed gas, heat of air or oxygen introduced into the pyrolyzed gas reforming reactor, and heat of steam simultaneously introduced with the air or oxygen, and heat generated by partial oxidization of the pyrolyzed gas by using the air or oxygen;

(67) The biomass gasification method according to any one of the aspects (41) to (66), wherein the granules and/or lumps are selected from a group consisting of metal spheres and ceramic spheres;

(68) The biomass gasification method according to the aspect (67), wherein the metal spheres are composed of stainless steel:

(69) The biomass gasification method according to the aspect (67), wherein the ceramic spheres are composed a material selected from a group consisting of alumina, silica, silicon carbide, tungsten carbide, zirconia, and silicon nitride;

(70) The biomass gasification method according to any one of the aspects (41) to (69), wherein a gas-phase temperature in the biomass pyrolytic reactor is 400° C. to 700° C.;

(71) The biomass gasification method according to any one of the aspects (41) to (69), wherein the gas-phase temperature in the biomass pyrolytic reactor is 500° C. to 700° C.:

(72) The biomass gasification method according to any one of the aspects (41) to (69), wherein the gas-phase temperature in the biomass pyrolytic reactor is 550° C. to 650° C.;

(73) The biomass gasification method according to any one of the aspects (41) to (72), wherein a gas-phase temperature in the pyrolyzed gas reforming reactor is 700° C. to 1000° C.;

(74) The biomass gasification method according to any-one of the aspects (41) to (72), wherein the gas-phase temperature in the pyrolyzed gas reforming reactor is 850° C. to 950° C.;

(75) The biomass gasification method according to any one of the aspects (41) to (72), wherein the gas-phase temperature in the pyrolyzed gas reforming reactor is 880° C. to 930° C.;

(76) The biomass gasification method according to any one of the aspects (41) to (75), wherein the biomass is a high-ash-content biomass having an ash content of 5.0% by mass or more based on dry weight;

(77) The biomass gasification method according to any one of the aspects (41) to (75), wherein the biomass is a high-ash-content biomass having an ash content of 10.0% by mass to 30.0% by mass based on dry weight;

(78) The biomass gasification method according to any one of the aspects (41) to (75), wherein the biomass is a high-ash-content biomass having an ash content of 15.0% by mass to 20.0% by mas based on dry weight;

(79) The biomass gasification method according to any one of the aspects (41) to (78), wherein the biomass is selected from a group consisting of plant biomass, biological biomass, domestic waste, and food waste; and

(80) The high-ash content biomass gasification method according to any one of the aspects (41) to (78), wherein the biomass is selected from a group consisting of sewage sludge and domestic animal excretion.

Effects of Invention

Since temperatures of the biomass pyrolytic reactor and the pyrolyzed gas reforming reactor can be separately controlled in the device of the present invention, both the pyrolysis temperature of the biomass and the reforming temperature of the resulting pyrolyzed gas can be easily optimized for a long period. Thereby, on biomass pyrolytic reactor side, generation of diphosphorus pentoxide and potassium contained in biomass, particularly high-ash-content biomass can be inhibited, and on pyrolyzed gas reforming reactor side, generation of $N_2O$ can be inhibited, a production amount of a hydrogen-containing gas as a final product can be increased, and furthermore, amounts of tar and soot generated by the pyrolysis of the biomass can be reduced to the utmost. In addition, a reforming reactor side, air or oxygen in addition to steam can be blown into the reforming reactor so as to facilitate further decomposition and reforming of tar. As a result, troubles in the device due to diphosphorus pentoxide and potassium, as well as tar and soot can be remarkably reduced, and the gasification rate of generated tar can be maximized so that a high-calorie gas can be produced from biomass, in particular high-ash-content biomass, at high thermal efficiency and low cost. In addition, since the heating by the heat carriers is performed only in the biomass pyrolytic reactor, a time from startup to steady state can be remarkably reduced. Furthermore, since the biomass pyrolytic reactor and the pyrolyzed gas reforming reactor can be arranged in parallel in the device according to the present invention, the height of the device can be remarkably reduced from the conventional device in which the preheater, the reforming reactor, and the pyrolytic reactor are arranged from top to bottom in this order, so that manufacturing cost for the device can be significantly reduced.

DESCRIPTION OF EMBODIMENTS

Figure 1:
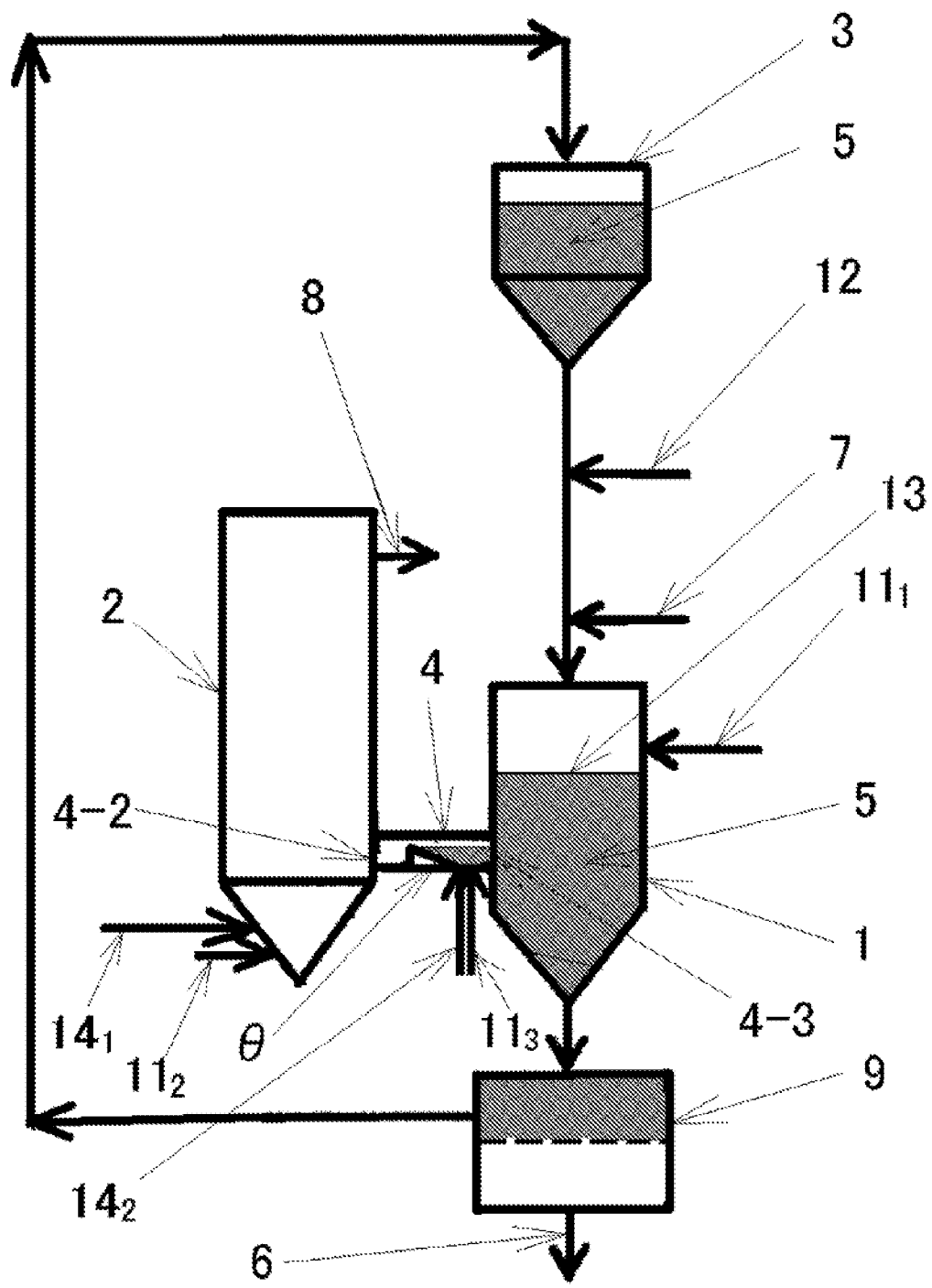
FIG. 1 is a schematic diagram illustrating an embodiment of a biomass gasification device of the present invention.

A gasification device of the present invention has: a biomass pyrolytic reactor having a biomass inlet and a non-oxidizing gas inlet and/or steam inlet; a pyrolyzed gas reforming reactor having a steam inlet and a reformed gas outlet; and a pyrolyzed gas introducing pipe for introducing a pyrolyzed gas generated in the biomass pyrolytic reactor into the pyrolyzed gas reforming reactor, provided between the biomass pyrolytic reactor and the pyrolyzed gas reforming reactor. The biomass pyrolytic reactor further has an introduction port and a discharge port for a plurality of preheated granules and/or lumps, i.e., beat-carrying medium (heat carriers), while the pyrolyzed gas reforming reactor further has an air or oxygen inlet. Additionally, the plurality of preheated granules and/or lumps are introduced into the biomass pyrolytic reactor, and pyrolysis of the biomass is performed by using heat of the plurality of preheated granules and/or lumps. The pyrolyzed gas generated in the biomass pyrolytic reactor is transferred to the pyrolyzed gas reforming reactor through the pyrolyzed gas introducing pipe, and in the pyrolyzed gas reforming reactor, the introduced pyrolyzed gas is partially oxidized by air or oxygen which is simultaneously introduced with steam, while the pyrolyzed gas is reformed by the introduced steam. In the gasification device of the present invention, the plurality of granules and/or lumps are introduced only into the biomass pyrolytic reactor for the pyrolysis of the biomass, and the pyrolyzed gas reforming reactor is separated from a flow of the plurality of granules and/or lumps so that heating and reforming of the pyrolyzed gas are performed by introducing steam and oxygen or air separately. Preferably, the heating and reforming of the pyrolyzed gas are performed by only using: heat of the pyrolyzed gas introduced into the pyrolyzed gas reforming reactor heat of the steam and the oxygen or air introduced into the pyrolyzed gas reforming reactor; and heat generated by partially oxidizing the pyrolyzed gas by the oxygen or air. In this way, since the biomass pyrolytic reactor and the pyrolyzed gas reforming reactor are not provided one above the other in series with respect to the flow of the plurality of preheated granules and/or lumps like the conventional biomass gasification device but are separated from each other, each of their temperatures can be separately controlled.

In the gasification device of the present invention, on a biomass pyrolytic reactor side, the pyrolyzed gas introducing pipe is provided on a side surface of the biomass pyrolytic reactor at a level lower than an upper surface of a layer of the plurality of granules and/or lumps, i.e., the heat carrier layer formed in the biomass pyrolytic reactor. That is, on the biomass pyrolytic reactor side, the gas intake port (gas inlet) of the pyrolyzed gas introducing pipe is provided in the layer consisting of the plurality of granules and/or lumps formed in the biomass pyrolytic reactor. On the other hand, on the pyrolyzed gas reforming reactor side, a position of a gas introduction port (gas outlet) of the pyrolyzed gas introducing pipe is not particularly limited as long as the introduced pyrolyzed gas can be reformed, but preferably, the gas introduction port (gas outlet) of the pyrolyzed gas introducing pipe is provided on a bottom or its vicinity of the pyrolyzed gas reforming reactor. Then, the pyrolyzed gas generated in the biomass pyrolytic reactor is introduced into the pyrolyzed gas reforming reactor through the pyrolyzed gas introducing pipe. Since the pyrolyzed gas intake port of the pyrolyzed gas introducing pipe is provided in the layer consisting of the plurality of granules and/or lumps as mentioned above, some of the plurality of granules and/or lumps in the biomass pyrolytic reactor can enter the inside of the pyrolyzed gas introducing pipe, and the pyrolyzed gas introducing pipe can hold the plurality of granules and/or lumps inside it. In addition, since the pyrolyzed gas introducing pipe is preferably provided substantially horizontally with respect to the gravity direction, the plurality of granules and/or lumps easily enter the inside of the pyrolyzed gas introducing pipe, and the plurality of granules and/or lumps held inside the pyrolyzed gas introducing pipe can be continuously and gradually replaced with the plurality of granules and/or lumps moving from top to bottom as the flow of the plurality of granules and/or lumps move from top to bottom in the biomass pyrolytic reactor by gravity. Thereby, the plurality of granules and/or lumps held in the pyrolyzed gas introducing pipe can keep a new state. Furthermore, the plurality of granules and/or lumps flowing from the biomass pyrolytic reactor into the pyrolyzed gas introducing pipe can be avoided from being mixed into the pyrolyzed gas reforming reactor. Since the plurality of granules and/or lumps are held in the pyrolyzed gas introducing pipe as mentioned above, tar, soot, and the like contained in the pyrolyzed gas introduced into the pyrolyzed gas reforming reactor through the pyrolyzed gas introducing pipe are captured by contact with the plurality of granules and/or lumps. Then, in the reactor, a part or most of the captured tar is pyrolyzed and gasified by heat of the plurality of granules and/or lumps, and preferably is further reformed. In addition, the tar, soot, and the like remaining without being gasified are discharged from the bottom of the biomass pyrolytic reactor while adhering to the plurality of granules and/or lumps. Thereby, tar, soot, and the like can be effectively removed from the pyrolyzed gas.

In the gasification device of the present invention, the inner bottom face of the pyrolyzed gas introducing pipe preferably has a structure protruding upward. By the structure protruding upward of the inner bottom face of the pyrolyzed gas introducing pipe as mentioned above, it is possible to more effectively prevent the problem that the plurality of granules and/or lumps flowing from the biomass pyrolytic reactor into the pyrolyzed gas introducing pipe enter the pyrolyzed gas reforming reactor. More preferably, the inner bottom face of the pyrolyzed gas introducing pipe has a structure protruding upward with an inclination from the biomass pyrolytic reactor side toward the pyrolyzed gas reforming reactor side. The inclination angle θ is preferably 5 to 45 degrees, more preferably 10 to 30 degrees, even more preferably 15 to 25 degrees. Also, as the protruding structure, the inner bottom face of the pyrolyzed gas introducing pipe may have a structure protruding upward with an inclination from both the biomass pyrolytic reactor side and the pyrolyzed gas reforming reactor side toward the central portion. In such a case, the inclination angles θ on both the biomass pyrolytic reactor side and the pyrolyzed gas reforming reactor side may be the same or different from each other By providing such an inclination, the plurality of granules and/or lumps entering from the biomass pyrolytic reactor into the pyrolyzed gas introducing pipe are prevented from stagnating in the pyrolyzed gas introducing pipe, and replacement of the plurality of granules and/or lumps in the pyrolyzed gas introducing pipe is enhanced. In relation to the pyrolyzed gas introducing pipe, an inner shape of the cross section perpendicular to the longitudinal direction, i.e., cross section perpendicular to the flow direction of the pyrolyzed gas is preferably substantially circular or substantially polygonal, more preferably substantially rectangular. The inner diameter of the pyrolyzed gas introducing pipe is not particularly limited as long as the diameter allows the plurality of granules and/or lumps to easily flow into and from the pyrolyzed gas introducing pipe. In addition, preferably one to three, more preferably one or two pyrolyzed gas introducing pipes are provided between the biomass pyrolytic reactor and the pyrolyzed gas reforming reactor.

In the gasification device of the present invention, the steam inlet is preferably provided on at least one position selected from a group consisting of: the biomass pyrolytic reactor and its vicinity; the pyrolyzed gas reforming reactor and its vicinity; and the pyrolyzed gas introducing pipe. More preferably, the steam inlet is provided on all of the biomass pyrolytic reactor or its vicinity the pyrolyzed gas reforming reactor or its vicinity, and the pyrolyzed gas introducing pipe. Thereby, pyrolysis of the biomass and reforming of the pyrolyzed gas can be more preferably achieved. When reforming the pyrolyzed gas, steam is blown from, preferably, the steam inlets provided on the pyrolyzed gas reforming reactor or its vicinity and on the pyrolyzed gas introducing pipe, or more preferably, the steam inlet provided on the pyrolyzed gas reforming reactor or its vicinity. The number of the steam inlets is not particularly limited, but preferably one to three, more preferably one inlet is provided on each of the biomass pyrolytic reactor or its vicinity, the pyrolyzed gas reforming reactor or its vicinity, and the pyrolyzed gas introducing pipe.

In the gasification device of the present invention, the air or oxygen inlet is preferably provided on at least one position selected from a group consisting of: the pyrolyzed gas reforming reactor and its vicinity; and the pyrolyzed gas introducing pipe. More preferably, the air or oxygen inlet is provided on all of the pyrolyzed gas reforming reactor or its vicinity, and the pyrolyzed gas introducing pipe. Thereby, reforming of the pyrolyzed gas can be more preferably achieved. The number of the air or oxygen inlets is not particularly limited, but preferably one to three, more preferably one inlet is provided on each of the pyrolyzed gas reforming reactor or its vicinity, and the pyrolyzed gas introducing pipe. As described above, in the gasification device of the present invention, the pyrolyzed gas is partially oxidized by using air or oxygen supplied from the air or oxygen inlet, and the steam reforming is performed by using heat generated by the partial oxidization. Therefore, the pyrolyzed gas reforming reactor generally does not have a heater, such as a heater for supplying heat from exterior and/or interior of the pyrolyzed gas reforming reactor by steam, electric heater, or the like, for example.

In the gasification device of the present invention, a preheater for preheating the plurality of granules and/or lumps is provided above the biomass pyrolytic reactor. Thereby, the plurality of granules and/or lumps are heated to a predetermined temperature. Preferably, one preheater is provided above the biomass pyrolytic reactor, where whole granules and/or lumps are heated to a predetermined temperature, and the granules and/or lumps heated to that temperature can be introduced into the biomass pyrolytic reactor by gravity. By adopting this configuration, the cost for the device can be reduced, and when the temperature for pyrolyzing the biomass is controlled depending on the quantity of the steam introduced to the biomass pyrolytic reactor, pyrolysis can be performed easily and more effectively by the introduced steam, while energy required for heating the granules and/or lumps can be saved.

In addition, an introduction port for the plurality of granules and/or lumps is provided on an upper portion, preferably top portion of the biomass pyrolytic reactor, and on the other hand, a discharge port for the plurality of granules and/or lumps is provided on a lower portion, preferably bottom of the biomass pyrolytic reactor. For the introduction port and the discharge port for the plurality of granules and/or lumps, for example a so-called two-stage valve system having one valve on each of the top and the bottom of the pipe, i.e., a total of two valves, is used. Note that the aforementioned introduction and discharge systems are one example, and the present invention is not limited to the systems.

The granules and/or lumps. i.e., the heat-carrying medium (heat carriers) should preferably be composed of at least one material selected from the group consisting of metals and ceramics. The metals include iron, stainless steel, nickel alloy steel, and titanium alloy steel, and stainless steel is most preferred. The ceramics include alumina, silica, silicon carbide, tungsten carbide, zirconia, and silicon nitride, and alumina is most preferred. The granules and/or lumps each should preferably have a spherical or globular shape, but do not need to be spherical and may have an elliptical or oval cross section. The maximum diameter of the granules and/or lumps should preferably be 3 to 25 mm, more preferably be 8 to 15 mm. Granules and/or lumps having a diameter above the upper limit have decreased flowability in the biomass pyrolytic reactor, i.e., less freely fall, and thus may stay in to plug the biomass pyrolytic reactor. On the otherhand, granules and/or lumps having a diameter below the lower limit may be deposited on to plug the biomass pyrolytic reactor and the pyrolyzed gas reforming reactor due to the tar and soot adhering to the granules and/or lumps. For example, granules and/or lumps having a diameter smaller than 3 mm may be deposited and grown on the inner wall of the biomass pyrolytic reactor due to the tar, soot, and the like adhering to the granules and/or lumps, and in the worst case, may plug the biomass pyrolytic reactor. When such granules and/or lumps having a diameter smaller than 3 mm are discharged through a valve at the bottom of the biomass pyrolytic reactor, the granules and/or lumps, which are light and accompanied with tar, do not freely fall and may be deposited on the inside of the valve, leading to plugging.

The biomass in the present invention indicates so-called biomass resources. Examples of the biomass resources include plant biomass, e.g., forestry waste, such as thinnings, scrap lumbers, pruned branches, timbers remaining in woodlands, and unused trees, agricultural waste, such as crops (residual vegetables and fruits), and straws and hulls of rice and wheat, seaweeds, and scrap wood from buildings; biological biomass, e.g., biological excretion such as domestic animal excretion and sewage sludge; domestic waste such as garbage; and food waste. The device according to the present invention should preferably be suitable for the gasification of plant biomass and biological biomass. Most especially, the device according to the present invention should be suitable for the gasification of high-ash-content biomass, particularly sewage sludge and domestic animal excretion, having an ash content of: preferably 5.0% or more by mass; more preferably 10.0% by mass to 30.0% by mass: even more preferably 15.0% by mass to 20.0% by mass.

Figure 4:
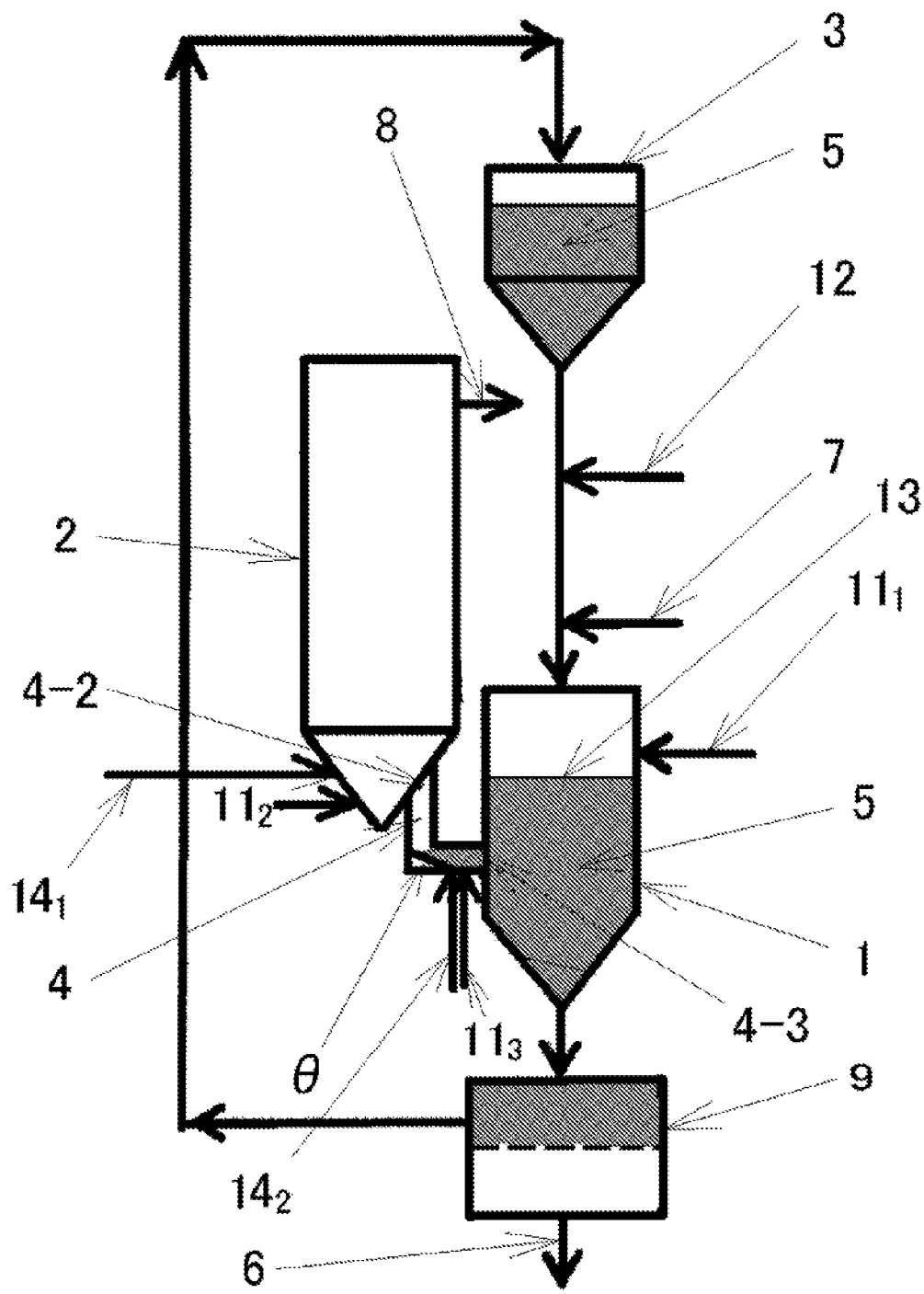
FIG. 4 is a schematic diagram illustrating other embodiment of the pyrolyzed gas introducing pipe in the biomass gasification device of the present invention.
Figure 5:
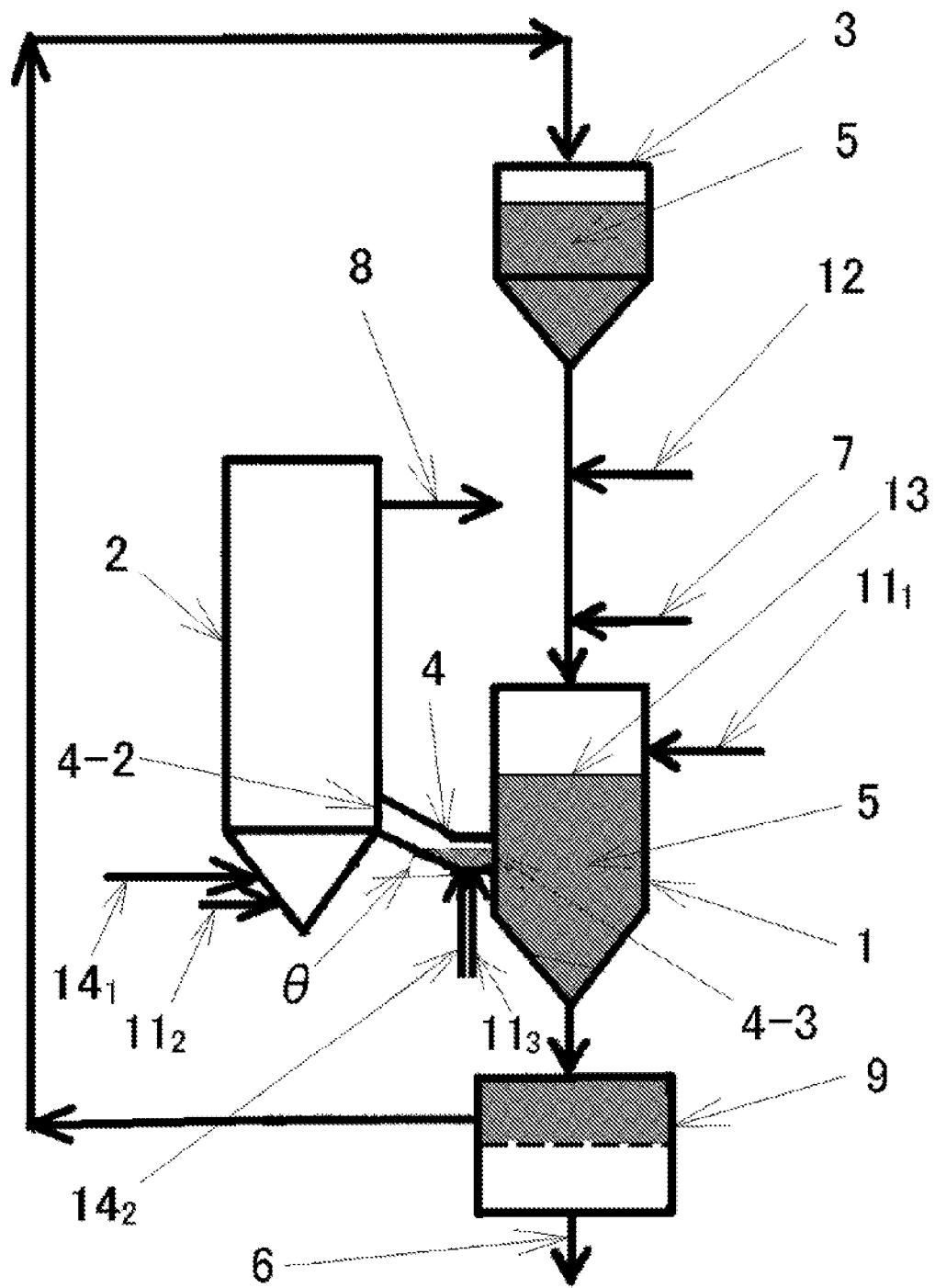
FIG. 5 is a schematic diagram illustrating other embodiment of the pyrolyzed gas introducing pipe in the biomass gasification device of the present invention.

The gasification device according to the present invention will now be described with reference to the accompanying drawings. FIG. 1 is a schematic diagram illustrating an embodiment of the biomass gasification device of the present invention. The biomass gasification device has: a biomass pyrolytic reactor 1, in which biomass is pyrolyzed by using heat of a plurality of preheated granules and/or lumps 5 i.e., heat carriers; and a pyrolyzed gas reforming reactor 2, in which a pyrolyzed gas generated by the pyrolysis of the biomass is partially oxidized by using oxygen or air which is simultaneously but separately introduced with steam, and then the pyrolyzed gas is steam-reformed by using heat obtained by the partial oxidation. Also, a preheater 3 for preheating the plurality of preheated granules and/or lumps 5 is provided above the biomass pyrolytic reactor 1. Also, one pyrolyzed gas introducing pipe 4 is provided between the biomass pyrolytic reactor 1 and the pyrolyzed gas reforming reactor 2 so as to introduce the pyrolyzed gas generated in the biomass pyrolytic reactor 1 into the pyrolyzed gas reforming reactor 2. Here, on a biomass pyrolytic reactor 1 side, the pyrolyzed gas introducing pipe 4 is provided on a side surface of the biomass pyrolytic reactor 1 at a level below an upper surface 13 of a layer of the plurality of preheated granules and/or lumps 5 formed in the biomass pyrolytic reactor 1. That is, a gas intake port (gas inlet) 4-3 of the pyrolyzed gas introducing pipe 4 on the biomass pyrolytic reactor 1 side is provided in the layer of the plurality of granules and/or lumps 5. On the other hand, on a pyrolyzed gas reforming reactor 2 side, the pyrolyzed gas introducing pipe 4 is connected to a bottom of the pyrolyzed gas reforming reactor 2. Also, the pyrolyzed gas introducing pipe 4 is provided between the biomass pyrolytic reactor 1 and the pyrolyzed gas reforming reactor 2 to be substantially parallel with respect to a gravity direction. Here, the pyrolyzed gas introducing pipe 4 can be configured so that, on the biomass pyrolytic reactor 1 side, it is provided to be substantially parallel with respect to the gravity direction, and on its downstream side, i.e., between the biomass pyrolytic reactor 1 and the pyrolyzed gas reforming reactor 2, it rises substantially vertically toward the pyrolyzed gas reforming reactor 2 to be connected to the bottom of the pyrolyzed gas reforming reactor 2 (FIG. 4). Alternatively, the pyrolyzed gas introducing pipe 4 can also be configured so that, between the biomass pyrolytic reactor 1 and the pyrolyzed gas reforming reactor 2, it rises upward toward the pyrolyzed gas reforming reactor 2 with an inclination angle θ to be connected to the bottom of the pyrolyzed gas reforming reactor 2 (FIG. 5). In addition, the inner bottom face of the pyrolyzed gas introducing pipe 4 preferably has a structure protruding upward. For example, from the biomass pyrolytic reactor 1 side toward the pyrolyzed gas reforming reactor 2 side, a protrusion is provided, which has an inclination angle θ of about 25 degrees from the bottom of the horizontal pipe. Note that the inner bottom face may have a flat structure.

The plurality of granules and/or lumps 5, i.e., the heat carriers is heated in a preheater 3 before being introduced into the biomass pyrolytic reactor 1. The heat carriers 5 should preferably be heated to 650° C. to 800° C., more preferably 700° C. to 750° C. At a temperature below the lower limit, the biomass, for example the high-ash-content biomass cannot be sufficiently pyrolyzed in the biomass pyrolytic reactor 1, and thus generation amount of the pyrolyzed gas is reduced. On the other hand at a temperature above the upper limit, volatilization of phosphors and potassium is occurred, which leads to plugging and corrosion of a pipe due to diphosphorus pentoxide and potassium. Also, heat carriers merely provide excess heat and cannot provide significantly improved effects, resulting in an increase in costs and a reduction in the thermal efficiency of the device.

Then, the heat carriers 5 heated in the preheater 3 to the predefined temperature are introduced into the biomass pyrolytic reactor 1. In the biomass pyrolytic reactor 1, the heat carriers 5 are brought into contact with biomass which is fed through a biomass inlet 7 to the biomass pyrolytic reactor 1 separately from the heat carriers 5. Here, the biomass inlet 7 may be provided on the biomass pyrolytic reactor 1 itself or may be provided, as illustrated in FIG. 1, in the vicinity of the biomass pyrolytic reactor 1, for example on a feeding pipe for the heat carriers 5 into the biomass pyrolytic reactor 1. The biomass pyrolytic reactor 1 is also fed with non-oxidizing gas such as nitrogen, and steam if required, through a non-oxidizing gas inlet 12 and the steam inlet $11_1$, respectively, to have a non-oxidizing atmosphere or an atmosphere of mixed gas of non-oxidizing gas and steam. The biomass is thermally decomposed through the contact with the heat carriers 5 to generate the pyrolyzed gas. The biomass pyrolytic reactor 1 in a non-oxidizing atmosphere can prevent the combustion of the biomass and facilitate efficient pyrolysis of the biomass. The resulting pyrolyzed gas passes through an introducing pipe 4 and is introduced into the pyrolyzed gas reforming reactor 2. At this time, tar, soot and, the like contained in the resulting pyrolyzed gas are captured by the heat carriers 5 held in the pyrolyzed gas introducing pipe 4, a part or most of tar is gasified by means of heat through the heat carriers 5, and the remaining tar, soot and, the like a discharged from the bottoms of the biomass pyrolytic reactor 1 while adhering to the heat carriers 5. An upper limit of a gas-phase temperature of the biomass pyrolytic reactor 1 should preferably be 700° C., more preferably be 650° C. whereas a lower limit thereof should preferably be 400° C., more preferably be 500° C., even more preferably be 550° C. At the gas-phase temperature below the lower limit, the pyrolysis of biomass may not proceed. At the gas-phase temperature above the upper limit, diphosphorus pentoxide and potassium, as well as heavy tar are generated. Although most of such heavy tar is combusted by using oxygen or air in the pyrolyzed gas reforming reactor 2 and removed, the trace remaining cannot be sufficiently reformed with steam and thus may cause troubles in the device. Here, the gas-phase temperature of the biomass pyrolytic reactor 1 means a temperature totally generated from a temperature generated by mixing the preheated heat carriers 5, the biomass as a raw material, non-oxidizing gas, and steam which is optionally blown into the biomass pyrolytic reactor 1, as well as radiant heat or the like of the layer of the heat carriers 5. The gas-phase temperature of the biomass pyrolytic reactor 1 can be appropriately controlled depending on a feeding rate and a discharge rate of the heat carriers 5, a volume and a occupancy rate of the layer of the heat carriers 5 in the biomass pyrolytic reactor 1, a feeding rate of the biomass, a feeding rate of non-oxidizing gas and/or steam, and the like. Typically, the feeding rate and the discharge rate of the heat carriers 5 are determined from the feeding rate of the biomass, then the feeding rate of the non-oxidizing gas and/or steam is appropriately changed while gradually changing the volume and the occupancy rate of the layer of the heat carriers 5 in the biomass pyrolytic reactor 1, and thereby the gas-phase temperature of the biomass pyrolytic reactor 1 can be controlled to be a predetermined temperature.

The pyrolyzed gas generated by pyrolyzing the biomass in the biomass pyrolytic reactor 1 is introduced into the pyrolyzed gas reforming reactor 2 through the pyrolyzed gas introducing pipe 4. The pyrolyzed gas which has been introduced into the pyrolyzed gas reforming reactor 2 is partially oxidized by using air or oxygen so as to heat the inside of the pyrolyzed gas reforming reactor 2. The pyrolyzed gas thus reacts with steam to be reformed into hydrogen-rich gas. Here, some of the tar accompanying the pyrolyzed gas is partially oxidized by using air or oxygen and consumed as a heat source, while the other is reformed by using steam and oxygen. The steam for reforming the gas is introduced through steam inlets $11_1$, $11_2$, $11_3$ provided on at least one position selected from a group consisting of the biomass pyrolytic reactor 1 and its vicinity, the pyrolyzed gas reforming reactor 2 and its vicinity, and the pyrolyzed gas introducing pipe 4 between the biomass pyrolytic reactor 1 and the pyrolyzed gas reforming reactor 2. Preferably, the steam for reforming the gas is introduced through all of the steam inlets $11_1$, $11_2$, $11_3$ provided on the biomass pyrolytic reactor 1 or its vicinity, on the pyrolyzed gas reforming reactor 2 or its vicinity, and the pyrolyzed gas introducing pipe 4. More preferably, the steam is introduced through the steam inlets $11_2$, $11_3$ provided on the pyrolyzed gas reforming reactor 2 or its vicinity and the pyrolyzed gas introducing pipe 4, or the steam can also be introduced only from the steam inlet $11_2$ provided on the pyrolyzed gas reforming reactor 2 or its vicinity. Also, oxygen or air is introduced through oxygen or air inlets $14_1$, $14_2$ provided on at least one position selected from a group consisting of the pyrolyzed gas reforming reactor 2 and its vicinity, and the pyrolyzed gas introducing pipe 4 between the biomass pyrolytic reactor 1 and the pyrolyzed gas reforming reactor 2. Preferably, the oxygen or air is introduced through all of the oxygen or air inlets $14_1$, $14_2$ provided on the pyrolyzed gas reforming reactor or its vicinity, and the pyrolyzed gas introducing pipe. An upper limit of a gas-phase temperature of the pyrolyzed gas reforming reactor 2 should preferably be 1,000° C., more preferably be 950° C., even more preferably be 930° C., whereas a lower limit should preferably be 850° C., more preferably be 880° C., even more preferably be 900° C. A gas-phase temperature below the lower limit may inhibit the reforming reaction from proceeding. In addition, it may cause generation of $N_2O$. A gas-phase temperature above the upper limit cannot provide significantly improved effects and increases the calorific value required for heating, resulting in cost increase. At a gas-phase temperature of the preferred lower limit (850° C.) or higher in the pyrolyzed gas reforming reactor 2, carbon monoxide is significantly reformed with steam. At a gas-phase temperature of the more preferred lower limit (880° C.) or higher, methane is significantly reformed with steam. In other words, the gas-phase temperature in the pyrolyzed gas reforming reactor 2 should preferably be 880° C. or higher to effectively reform both the carbon monoxide and the methane. Although the pyrolyzed gas can be sufficiently reformed at a gas-phase temperature of the more preferred upper limit (950° C.) or lower in the pyrolyzed gas reforming reactor 2, the gas-phase temperature should preferably be 930° C. or lower to reduce the amount of used fuel. Here, the gas-phase temperature of the pyrolyzed gas reforming reactor 2 means a gas-phase temperature inside the pyrolyzed gas reforming reactor totally generated from a temperature generated by mixing the pyrolyzed gas, the steam, and the air or oxygen which are introduced into the pyrolyzed gas reforming reactor 2. The gas-phase temperature of the pyrolyzed gas reforming reactor 2 can be appropriately controlled depending on a supplied amount of air or oxygen.

Most of the heat required for pyrolysis of the biomass in the biomass pyrolytic reactor 1 is supplied by the granules and/or lumps 5, i.e., heat-carrying medium (heat carriers) preheated to the predetermined temperature. The introduction of the heat carriers 5 into the biomass pyrolytic reactor 1 and the discharge of the heat carriers 5 from the biomass pyrolytic reactor 1 is performed by using, for example, a two-stage valve mechanism (not shown) including two valves provided at the respective upper and lower portions of a pipe. The manipulation of the two-stage valve mechanism will now be briefly explained. The upper and lower valves are closed in an initial state. The upper valve is opened such that the heat carriers 5 fall in the pipe and stay in the space between the upper and lower valves. The upper valve is then closed whereas the lower valve is opened such that the heat carriers 5 filled between the two valves are introduced into or discharged from the biomass pyrolytic reactor 1. This manipulation of the valves is repeated, so that the heat carriers 5 are substantially continuously introduced into or discharged from the biomass pyrolytic reactor 1. The introduction and the discharge may be based on any means other than this example. Through the control of the rate of the introduction of the heat carriers 5 into the biomass pyrolytic reactor 1 and the rate of the discharge of the heat carriers 5 from the biomass pyrolytic reactor 1, the layer of the heat carriers 5 can be formed in the biomass pyrolytic reactor 1 and its thickness can be appropriately controlled, and the temperature of the biomass pyrolytic reactor 1 can be controlled within the predetermined range. In this way, the internal temperature of the biomass pyrolytic reactor 1 and the pyrolyzed gas reforming reactor 2 can be separately controlled by the configuration that the heat carriers 5 are introduced only into the biomass pyrolytic reactor 1 and the biomass is pyrolyzed by using their heat, while steam and oxygen or air are introduced into the pyrolyzed gas reforming reactor 2 and reforming is performed by using them. Thereby, the reforming reaction in the pyrolyzed gas reforming reactor 2 can be progressed at a proper temperature, and at the same time, pyrolysis of the biomass in the biomass pyrolytic reactor 1 can be performed at a proper temperature. Furthermore, a thermal efficiency can be improved. Furthermore, the heat carriers 5 are introduced only into the biomass pyrolytic reactor 1, and the preheater 3 and the biomass pyrolytic reactor 1 are preferably disposed vertically so that the heat carriers 5 naturally fall by gravity, and thereby an energy-conserving efficient gasification device can be made without requiring power for moving the heat carriers 5.

A significantly high rate of the discharge of the heat carriers 5 from the biomass pyrolytic reactor 1 causes increases in the temperatures of the biomass pyrolytic reactor 1. On the other hand a significantly low rate of the discharge causes a decrease in the temperatures of the biomass pyrolytic reactor 1 due to the heat dissipation from the heat carriers 5. The rates of the introduction and the discharge of the heat carriers 5 into and from the biomass pyrolytic reactor 1 vary depending on the supplied amount, type, water content, and ash content of the material (biomass). In general, the rates are determined based on the supplied amount of the biomass. The rates are typically 5 to 60 times by mass the feeding rate of the dry material (dry biomass) to the biomass pyrolytic reactor 1. The rates should preferably be 5 to 30 times by mass, more preferably be 10 to 20 times by mass the feeding rate of the dry biomass to the biomass pyrolytic reactor 1. Rates below the lower limit do not allow the heat carriers 5 to provide sufficient calories for pyrolysis of the biomass. Meanwhile, rates above the upper limit merely increase the supplied amount of the heat carriers 5, which configuration requires a significantly large biomass pyrolytic reactor 1 and requires extra calories for preheating the heat carriers 5.

An upper limit of a pressure in the biomass pyrolytic reactor 1 and the pyrolyzed gas reforming reactor 2 should preferably be 104.33 kPa, more preferably be 102.33 kPa, whereas the lower limit should preferably be 100.33 kPa, more preferably be 101.23 kPa. At a pressure above the upper limit, the resulting pyrolyzed gas may flow backward and leak through the biomass inlet 7 to the outside of the biomass pyrolytic reactor 1. Meanwhile, at a pressure below the lower limit, the resulting pyrolyzed gas does not pass homogeneously through the layer of the heat carriers in the biomass pyrolytic reactor 1 and the pyrolyzed gas introducing pipe 4 so that the pyrolyzed gas and the accompanying tar sometimes cannot be sufficiently gasified and reformed.

The steam inlets $11_1$, $11_2$, and $11_3$ should preferably be disposed on the biomass pyrolytic reactor 1, the bottom of the pyrolyzed gas reforming reactor 2, and the pyrolyzed gas introducing pipe 4 between the biomass pyrolytic reactor 1 and the pyrolyzed gas reforming reactor 2. In the biomass pyrolytic reactor 1, it should preferably be disposed at the upper portion of the biomass pyrolytic reactor 1. This configuration can effectively contact the steam with the heat carriers 5 introduced into the biomass pyrolytic reactor 1, and can keep the steam in contact with not only the gas generated by pyrolyzing biomass but also the heat carriers 5 for a long time. As as result, the pyrolyzed gas and the tar adhering to the heat carriers 5 can be efficiently gasified and reformed. Although the three steam inlets $11_2$, $11_1$, and $11_3$ are respectively disposed at the lower portion of the pyrolyzed gas reforming reactor 2, the upper portion of the biomass pyrolytic reactor 1, and the pyrolyzed gas introducing pipe 4 in FIG. 1, any other arrangement can also be employed. Multiple steam inlets should be disposed at each of these portions. The temperature of the introduced steam is any temperature, preferably 130° C. to 200° C., more preferably about 160° C. The superheated steam at 500° C. to 600° C. can also be preferably used. For example, upon the introduction of the more preferred steam at about 160° C., the supplied weight of the steam should preferably be substantially equal to the supplied weight of the material (biomass). Note that the amount of the steam may be increased or decreased depending on the moisture amount of the material, thereby it is not limited to those described above.

The air or oxygen inlets $14_1$, $14_2$ are preferably provided on the bottom of the pyrolyzed gas reforming reactor 2, and on the pyrolyzed gas introducing pipe 4 between the biomass pyrolytic reactor 1 and the pyrolyzed gas reforming reactor 2. By blowing air or oxygen into the pyrolyzed gas reforming reactor 1, the pyrolyzed gas of the biomass, or in particular, tar and the like accompanying the gas is partially oxidized, and steam reforming can be effectively performed by using heat generated by the partial oxidization. Although two air or oxygen inlets $14_1$ and $14_2$ are respectively disposed at the lower portion of the pyrolyzed gas reforming reactor 1 and the pyrolyzed gas introducing pipe 4 in FIG. 1, any other arrangement can also be employed. Multiple air or oxygen inlets should be disposed at each of these portions. The temperature of the introduced air or oxygen is any temperature, preferably a room temperature to 700° C., more preferably 300 to 600° C.

The biomass inlet 7 only needs to be disposed at a position for effectively feeding the biomass to the biomass pyrolytic reactor 1. The biomass inlet 7 should preferably be disposed above the biomass pyrolytic reactor 1. i.e., on a pipe allowing the heat carriers 5 to fall from the preheater 3 into the biomass pyrolytic reactor 1. This configuration can efficiently mix the biomass and the heat carriers 5 and can ensure the appropriate contact duration in the biomass pyrolytic reactor 1 to sufficiently pyrolyze the biomass. Although FIG. 1 depicts a single biomass inlet 7, any other arrangement can also be employed. Preferably at least one, more preferably one to five, even more preferably one to three, still more preferably one or two biomass inlets 7 should be disposed. Multiple biomass inlets 7 can simultaneously feed different types of biomass through the respective inlets.

The retention time of the biomass in the biomass pyrolytic reactor 1 should preferably be 5 to 60 minutes, more preferably 10 to 40 minutes, more preferably 15 to 35 minutes. A retention time below the lower limit does not allow the biomass to be uniformly heated or uniformly pyrolyzed, resulting in a decrease in the volume of the resulting pyrolyzed gas. Meanwhile, a retention time above the upper limit cannot provide significantly improved effects, resulting in an increase in costs for the device. Here, the retention time of the biomass in the biomass pyrolytic reactor 1 can be appropriately controlled based on the traveling speed of the heat carriers 5 and the supplied amount of the biomass. The retention time of the gas in the pyrolyzed gas reforming reactor 2 should preferably be 1 to 10 seconds, more preferably be 2 to 5 seconds. The retention time of the gas in the gas reforming reactor 2 can be determined based on the supplied amount of the steam and air or oxygen, and the amount of the pyrolyzed gas to be generated. When the pyrolyzed gas reforming reactor 2 and the biomass pyrolytic reactor 1 were connected one above the other in series as in the prior art, a retention time in each reactor, i.e., retention times for pyrolyzing the biomass and for decomposing tar in the pyrolyzed gas in the biomass pyrolytic reactor 1, and a retention time required for the reforming reaction of the pyrolyzed gas and steam in the pyrolyzed gas reforming reactor 2 could not be separately controlled. However, in the present invention, the retention time in each reactor 1, 2 can be independently controlled by heating only the biomass pyrolytic reactor 1 by the heat carrier 5 and separately heating the pyrolyzed gas reforming reactor 2 by partial oxidization of the pyrolyzed gas via introduction of oxygen or air, and thus it has become possible to independently control the internal temperature in each reactor 1, 2.

The heat carriers 5, which have passed through the biomass pyrolytic reactor 1 as explained above, are discharged through the bottom of the biomass pyrolytic reactor 1 together with a residue of the pyrolysis of biomass (char) and slight amounts of tar and soot that are not pyrolyzed and remain on the heat carriers 5. The waste containing the discharged heat carriers 5 can be treated by any known technique such as isolating the char in the waste processing device 9 as shown in FIG. 1. For example, methods and devices disclosed in Patent Documents 4 and 5 can be employed as described above. The processed heat carriers 5 are returned to the preheater 3 and introduced into the biomass pyrolytic reactor 1 again.

Figure 2:
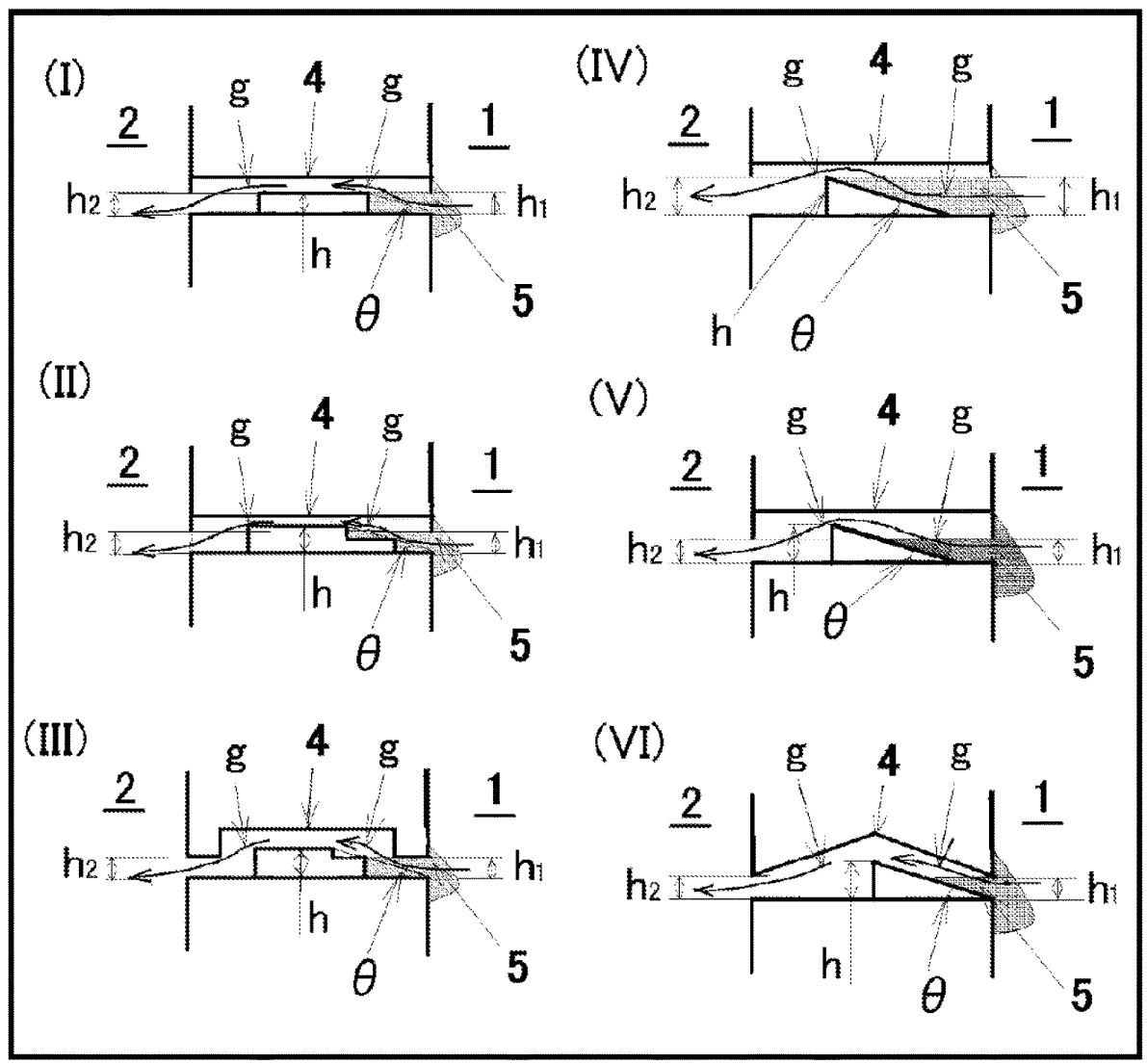
FIG. 2 is a schematic diagram illustrating several different embodiments of a pyrolyzed gas introducing pipe provided between the biomass pyrolytic reactor and the pyrolyzed gas reforming reactor.

FIG. 2 is a schematic diagram illustrating several different embodiments (I, II, III, IV, V, VI) of the pyrolyzed gas introducing pipe 4 provided between the biomass pyrolytic reactor 1 and the pyrolyzed gas reforming reactor 2. FIG. 2 shows a cross section in a longitudinal direction (cross section along the flow direction of the pyrolyzed gas) of the pyrolyzed gas introducing pipe 4. In addition, in FIG. 2, (g) schematically shows the flow direction of the pyrolyzed gas. In FIG. 2, the right side of the drawing is the biomass pyrolytic reactor 1 (indicated as 1 in FIG. 2) and the left side of the drawing is the pyrolyzed gas reforming reactor 2 (indicated as 2 in FIG. 2). Also, only the heat carriers 5 in the pyrolyzed gas introducing pipe 4 are schematically shown by coloring, and the heat carriers 5 in the biomass pyrolytic reactor 1 are not shown. In addition, although not shown in FIG. 2, the inner bottom face of the pyrolyzed gas introducing pipe 4 may be a plane surface which does not project upward. All of the pyrolyzed gas introducing pipes 4 shown in FIG. 2 can be used for the biomass pyrolytic device of the present invention, e.g., the biomass pyrolytic device shown in FIG. 1. That is, on the biomass pyrolytic reactor 1 side, the pyrolyzed gas introducing pipe 4 is provided on a side surface of the biomass pyrolytic reactor 1 at a level below an upper surface 13 of the layer of the heat carriers 5 formed inside the biomass pyrolytic reactor 1. Additionally, the pyrolyzed gas introducing pipe 4 is preferably provided substantially horizontally with respect to the gravity direction, and the inner bottom face of the pyrolyzed gas introducing pipe 4 has a structure protruding upward. The pyrolyzed gas introducing pipe 4 preferably has a structure shown in (I), (II), (III), (V), (V), and (VI). That is, the height (h) of the inner bottom face of the pyrolyzed gas introducing pipe 4 is the same (I, IV) as or higher (II, III, V, VI) than the widths in the vertical direction (height)($h_1$, $h_2$) of the gas intake port (gas inlet) and introduction port (gas outlet) of the pyrolyzed gas introducing pipe 4. The structure that the height (h) of the protruding portion is higher than the width in the vertical direction (height) ($h_1$, $h_2$) of the gas intake port and introduction port of the pyrolyzed gas introducing pipe 4 is more preferable (II, III, V, VI). By adopting such a structure, heat carriers 5 can be more reliably prevented from flowing from the biomass pyrolytic reactor 1 into the pyrolyzed gas reforming reactor 2. The structures of (VI), (V), and (VI) in FIG. 2 are more preferable. For example, the structure having inclination angles θ in two stages as shown in (II) in FIG. 2 may be inferior to the structure of (V) in FIG. 2 having the same inclination angles θ in terms of the effect for avoiding the stagnation of the heat carriers 5 in the pyrolyzed gas introducing pipe 4. Accordingly, in the protruding portion in a stepwise protruding shape as shown in the left column of FIG. 2, the number of the steps is preferably increased. The inclination angle θ is preferably 5 to 45 degrees, more preferably 10 to 30 degrees, even more preferably 15 to 25 degrees. In addition, although the pyrolyzed gas introducing pipe 4 is a basically horizontal pipe as shown in (I) and (VI) in FIG. 2, it may also have a structure that a recess is provided on the internal upper surface of the pipe as shown in (III) or that a recess having an inclination is provided on the internal upper surface of the pipe as shown in (VI). Furthermore, the widths in the vertical direction (height) ($h_1$, $h_2$) of the gas intake port and the gas introduction port of the pyrolyzed gas introducing pipe 4 may be the same as or different from each other. The pyrolyzed gas introducing pipe 4 shown in FIG. 2 is an example and not a limitation. Furthermore, an inner shape of the cross section perpendicular to the longitudinal direction of the pyrolyzed gas introducing pipe 4 (cross section perpendicular to the flow direction of the pyrolyzed gas) is as described above, preferably is substantially circular or substantially polygonal, more preferably substantially rectangular. Further, the inner diameter of the pyrolyzed gas introducing pipe 4, i.e., the width in the vertical direction (height)($h_1$) of the gas intake port and the width in the vertical direction (height)($h_2$) of the gas introduction port are not particularly limited as long as the diameter allows the heat carriers 5 to easily flow into and from the pyrolyzed gas introducing pipe 4, and are preferably 8 to 50 times, more preferably 10 to 40 times, and even more preferably 10 to 30 times the size (maximum diameter) of the heat carriers 5.

The present invention will now be described in further detail with reference to the examples. The present invention should not be limited to the examples.

EXAMPLES

Example 1

A biomass raw material, and a gasifying device used for pyrolysis of the biomass raw material and reforming of gas in Example 1 will now be described.

Sewage sludge was granulated and used as the biomass raw material. The size of the granulated sewage sludge was approximately 6 to 15 mm. Table 1 shows the properties of the sewage sludge. Table 2 shows composition of ash obtained by combusting the sewage sludge.

TABLE 1

| Analysis item | Analysis value |
|---|---|
| Water | 20.0% by mass |
| Ash | 16.0% by mass |
| Volatile matter | 76.7% by mass |
| Fixed carbon | 7.3% by mass |
| Elemental Analysis | |
| C | 36.10% by mass |
| H | 5.98% by mass |
| O | 35.09% by mass |
| N | 5.26% by mass |
| S | less than 1.35% by mass |
| CL | less than 0.22% by mass |
| Higher calorific value | 16.9 MJ/kg |

For each value in Table 1.

the water content, volatile matter content, and fixed carbon content were measured in accordance with JIS M8812, the ash content was measured in accordance with JIS Z 7302-4: 2009, and the higher calorific value was measured in accordance with JIS M8814.

In addition, carbon (C), hydrogen (H) and nitrogen (N) in the element composition were measured in accordance with JIS Z 7302-8: 2002, sulfur (S) was measured in accordance with JIS Z 7302-7: 2002, and chlorine (Cl) was measured in accordance with JIS Z 7302-6: 1999.

In addition, oxygen (O) is determined by subtracting each percentage by mass of C, H, N, S, Cl and ash content from 100% by mass.

Herein, all of the ash, volatile matter and fixed carbon contents and the elemental composition were calculated on the basis of dry weight. Also, the water content was measured when the biomass raw material (sewage sludge) had been received.

TABLE 2

| Analysis item | Analysis value |
|---|---|
| Silicon dioxide | 25.60% by mass |
| Aluminum oxide | 17.00% by mass |
| Ferric oxide | 14.90% by mass |
| Magnesium oxide | 3.17% by mass |
| Calcium oxide | 9.01% by mass |
| Sodium oxide | 0.81% by mass |
| Potassium oxide | 1.49% by mass |
| Diphosphorus pentoxide | 20.70% by mass |
| Total Mercury | less than 0.005 mg/kg |

TABLE 2-continued

| Analysis item | Analysis value |
|---|---|
| Total Chromium | 200 mg/kg |
| Cadmium | 3 mg/kg |
| Copper oxide | 2400 mg/kg |
| Lead oxide | 110 mg/kg |
| Zinc oxide | 0.38% by mass |
| Manganese oxide | 0.24% by mass |
| Nickel | 120 mg/kg |

For each value in Table 2, silicon dioxide, aluminum oxide, ferric oxide, magnesium oxide, calcium oxide, sodium oxide, potassium oxide, diphosphorus pentoxide, and manganese oxide were measured in accordance with JIS M8815. In addition, mercury, chromium, cadmium, copper oxide, lead oxide, zinc oxide and nickel were measured in accordance with JIS Z 7302-5:2002.

The device illustrated in FIG. 1 was used as the gasification device for pyrolysis of the biomass raw material and reforming of the resulting pyrolyzed gas. The gasification device typically has a biomass pyrolytic reactor 1, a pyrolyzed gas reforming reactor 2, and a preheater 3, and the biomass pyrolytic reactor 1 and the pyrolyzed gas reforming reactor 2 is connected with each other via a pyrolyzed gas introducing pipe 4 which introduces a pyrolyzed gas generated in the biomass pyrolytic reactor 1 into the pyrolyzed gas reforming reactor 2. Here, one preheater 3 is provided above the biomass pyrolytic reactor 1. The preheater 3 is for preheating a plurality of granules and/or lumps (heat carriers) 5 to be supplied to the biomass pyrolytic reactor 1. The heated heat carriers 5 are supplied to the biomass pyrolytic reactor 1 for supplying heat for pyrolysis of the biomass, then discharged from a bottom of the biomass pyrolytic reactor 1, and returned to the preheater 3 again. The pyrolyzed gas generated in the biomass pyrolytic reactor 1 is introduced into the pyrolyzed gas reforming reactor 2 through the pyrolyzed gas introducing pipe 4. Here, air or oxygen is separately introduced from an air or oxygen introducing pipe $14_1$ into the pyrolyzed gas reforming reactor 2 for partially combusting the pyrolyzed gas, wherein steam is simultaneously introduced from a steam inlet $11_2$ for steam reforming of the pyrolyzed gas, and a resulting reformed gas is taken out from a reformed gas outlet 8. Instead of the air or oxygen introducing pipe $14_1$ and the steam inlet $11_2$, air or oxygen and steam can be introduced from an air or oxygen introducing pipe $14_2$ and a steam inlet $11_3$ provided on the pyrolyzed gas introducing pipe 4, or from all of the air or oxygen introducing pipes $14_1$, $14_2$ and the steam inlets $11_2$, $11_3$. A straight body portion of the biomass pyrolytic reactor 1 had an inner diameter of approximately 550 mm, a height of approximately 1,100 mm, and inner volume of approximately 260 liters. In addition, a straight body portion of the pyrolyzed gas reforming reactor 2 had an inner diameter of approximately 600 mm, a height of approximately 1200 mm, and inner volume of approximately 340 liters. As the pyrolyzed gas introducing pipe 4, one having a structure shown as (V) in FIG. 2 was used. Here, an inclination angle θ was 25 degrees with respect to the inner bottom face of the pipe from a biomass pyrolytic reactor 1 side toward a pyrolyzed gas reforming reactor 2 side. On the biomass pyrolytic reactor 1 side, the pyrolyzed gas introducing pipe 4 was provided on the side surface of the biomass pyrolytic reactor 1 at a level below the upper surface 13 of the layer of the heat carriers 5 formed in the biomass pyrolytic reactor 1, while on the pyrolyzed gas reforming reactor 2 side, it was provided on a side surface of the pyrolyzed gas reforming reactor 2 in the vicinity of the bottom face thereof. Also, the pyrolyzed gas introducing pipe 4 was provided substantially horizontal with respect to the gravity direction. As the pyrolyzed gas introducing pipe 4, a pipe having a length of approximately 1,000 mm and an inner diameter of approximately 80 mm was used. The inside of the pipe was covered with a heat insulating material, and the protrusion was also formed of the heat insulating material. As the heat carriers 5, a substantially spherical alumina sphere having diameter (maximum diameter) of 10 to 12 mm was used.

The biomass pyrolytic reactor 1 and the preheater 3 were previously filled with the heat carriers 5 up to approximately 70% of the height of each container, and then the heat carriers 5 were heated to approximately 700° C. in the preheater 3. Subsequently, the heat carriers 5 were introduced separately from the top portion of the biomass pyrolytic reactor 1 at a rate of 200 kg/hour, and appropriate amounts of them were separately discharged from the bottoms of the biomass pyrolytic reactor 1 to start the circulation of the heat carriers 5. By the circulation of the heat carriers 5, the gas-phase temperature inside the biomass pyrolytic reactor 1 and the temperature of the reactor itself were gradually increased. At the same time, the temperature of the heat carriers 5 in the preheater 3 was gradually increased to 800° C. while continuing this circulation of the heat carriers 5. After the temperature of the heat carriers 5 reached to 800° C., the circulation was further continued so that the gas phase temperatures inside the biomass pyrolytic reactor 1 were gradually increased, and from the time when the gas phase temperature of the biomass pyrolytic reactor 1 exceeded 550° C., the biomass raw material, nitrogen gas and steam were respectively introduced from a biomass inlet 7, a non-oxidizing gas inlet 12 and a steam inlet $11_1$ to the biomass pyrolytic reactor 1 to control the temperature of the biomass pyrolytic reactor 1 to be 600° C. At this time, the heat carriers 5 accumulated in layers in the biomass pyrolytic reactor 1, and their accumulation amounts were about 60% of the internal volume of the biomass pyrolytic reactor 1. A discharge rate of the heat carrier 5 from the biomass pyrolytic reactor 1 was the same as the feeding rate, and was 200 kg/hour in the biomass pyrolytic reactor 1. In addition, the temperature of the heat carriers 5 during discharge was 650° C. Note that the discharge rate of the heat carriers 5 from the biomass pyrolytic reactor 1 can be appropriately controlled depending on its temperature condition.

In the above operation, sewage sludge as the biomass raw material was continuously introduced from the biomass inlet 7 to the biomass pyrolytic reactor 1 using a quantitative feeder while gradually increasing the feeding rate so that the rate was finally about 22 kg/hour (based on dry weight). The temperature of the biomass pyrolytic reactor 1 was gradually decreased along with introduction of the biomass raw material, but at the same time, the temperature of the biomass pyrolytic reactor 1 was maintained at 600° C. by introducing nitrogen gas and superheated steam into the biomass pyrolytic reactor 1 while adjusting the feeding rate. Also, the pressure inside the biomass pyrolytic reactor 1 was maintained at 101.3 kPa. Here, nitrogen gas was introduced from the non-oxidizing gas inlet 12 provided on the upper portion of the biomass pyrolytic reactor 1 finally at a constant rate of 1,000 liters/hour. As the steam, superheated steam (160° C., 0.6 MPa) was used and introduced from the steam inlet $11_1$ provided on the upper portion of the biomass pyrolytic reactor 1 finally at a constant rate of 1 kg/hour. The retention time of the biomass raw material in the biomass pyrolytic reactor 1 was approximately 1 hour. Thereby, gas generated by pyrolysis in the biomass pyrolytic reactor 1 was obtained at a rate of 15 kg/hour. In addition, char and ash were discharged from a pyrolysis residue (char) outlet 6 at 6.5 kg/hour in total.

The pyrolyzed gas obtained in the biomass pyrolytic reactor 1 subsequently passed through the pyrolyzed gas introducing pipe 4 from the lower portion of the side surface of the biomass pyrolytic reactor 1, and was introduced into the pyrolyzed gas reforming reactor 2. The temperature inside the pyrolyzed gas reforming reactor 2 became unstable at the beginning of introduction of the pyrolyzed gas, but the temperature in the pyrolyzed gas reforming reactor 2 was adjusted to 1,000° C. by controlling an amount of superheated steam introduced from the steam inlet $11_2$ provided on the lower portion of the pyrolyzed gas reforming reactor 2 and an amount of oxygen introduced from the air or oxygen introducing pipe $14_1$ so as to partially combust the pyrolyzed gas. At this time, the pressure of the pyrolyzed gas reforming reactor 2 was maintained at 101.3 kPa. Superheated steam from the steam inlet $11_2$ provided on the lower portion of the pyrolyzed gas reforming reactor 2 was introduced finally at a constant rate of 3.7 kg/hour. Oxygen from the air or oxygen introducing pipe $14_1$ was introduced finally at a constant rate of 2.3 m³—normal/hour. Note that this oxygen amount was appropriately increased or decreased according to the degree of temperature rise in the pyrolyzed gas reforming reactor 2.

By the aforementioned operation, the biomass pyrolytic reactor 1 was maintained at 600° C. and 101.3 kPa, and the pyrolyzed gas reforming reactor 2 was maintained at 950° C. and 101.3 kPa. Thereby, the reformed gas at 1,000° C. could be obtained from the reformed gas outlet 8 at a rate of 31 kg/hour.

The resulting reformed gas was partly collected in a rubber bag and was analyzed with gas chromatography to determine the gas composition. Table 3 shows the composition of the resulting reformed gas. This operation could be continuously performed for three days. Ding the operational period, the reactor operated successfully and continuously without trouble, in particular, caused by tar. Additionally, during the operation period, smooth introduction of the pyrolyzed gas from the biomass pyrolytic reactor 1 to the pyrolyzed gas reforming reactor 2 was maintained without a trouble that the heat carriers 5 were plugged in the pyrolyzed gas introducing pipe 4 with tar and the like. The amount of tar in the reformed gas taken out from the outlet of the pyrolyzed gas reforming reactor 2 was approximately 10 g/m³—normal.

TABLE 3

| Component | Analysis value |
|---|---|
| $H_2$ | 53.9% by volume |
| CO | 26.9% by volume |
| $CO_2$ | 15.4% by volume |
| $CH_4$ | 0.3% by volume |
| HCL | 0.04% by mass |
| $H_2S$ | 0.46% by mass |
| $N_2$ | 3.0% by mass |

For each value in Table 3, hydrogen ($H_2$), carbon monoxide (CO), carbon dioxide ($CO_2$), methane ($CH_4$), and nitrogen ($N_2$) were analyzed and quantified with gas chromatography [GC-14A (trademark) manufactured by SHIMADZU CORPORATION] with a TCD (Thermal Conductive Detector). Also, hydrogen sulfide ($H_2S$) was analyzed and quantified with gas chromatography [GC-8A (trademark) manufactured by SHIMADZU CORPORATION] with an FPD (Flame Photometric Detector). For hydrogen chloride (HCL), an amount of hydrogen chloride was quantified by allowing the reformed gas to flow through pure water, and then measuring a pH value of the pure water by using a portable pH meter D-72 (trademark) manufactured by HORIBA, Ltd.

Comparative Example 1

Figure 3:
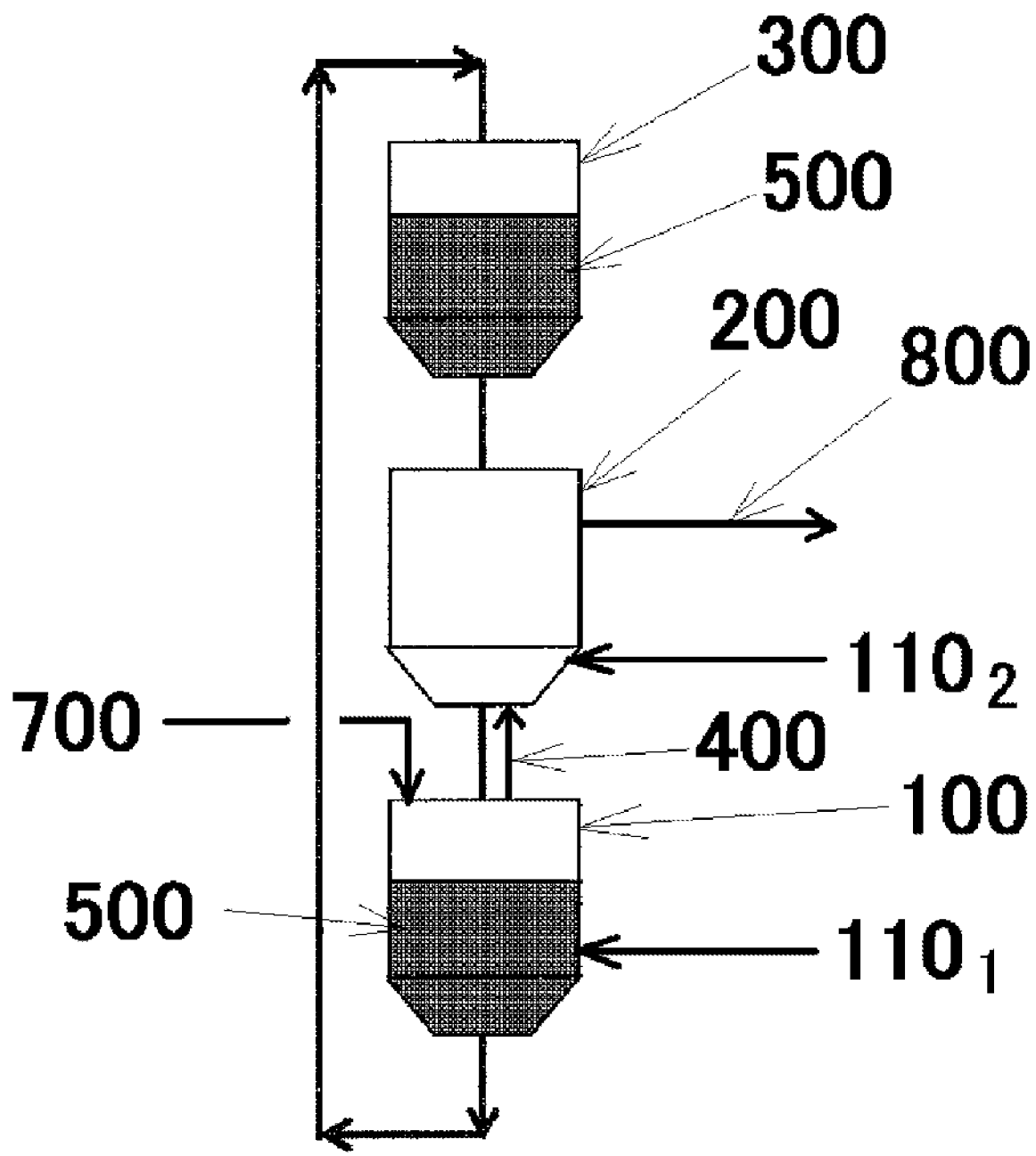
FIG. 3 is a schematic diagram illustrating a conventional biomass gasification device used in Comparative Example.

The gasification device shown in FIG. 3 was used for pyrolysis of a biomass raw material and reforming of resulting pyrolyzed gas. This device is similar to that described in Patent Document 5. The gasification device had a device configuration that a biomass pyrolytic reactor 100 and a pyrolyzed gas reforming reactor 200 were serially arranged with respect to a flow of heat carriers 500. One preheater 300 was provided on an upper portion of the pyrolyzed gas reforming reactor 200, and the preheater 300 was for preheating the heat carriers 500 to be supplied to the biomass pyrolytic reactor 100 and the pyrolyzed gas reforming reactor 200. A straight body portion of the preheater 300 had an inner diameter of approximately 800 mm, a height of 1400 mm, and inner volume of approximately 700 liters. A straight body portion of the biomass pyrolytic reactor 100 had an inner diameter of approximately 800 mm, a height of approximately 1000 mm, and inner volume of approximately 500 liters. In addition, a straight body portion of the pyrolyzed gas reforming reactor 200 had an inner diameter of approximately 800 mm, a height of approximately 1300 mm, and inner volume of approximately 650 liters. Also, a pipe 400 for transferring the pyrolyzed gas from the biomass pyrolytic reactor 100 to the pyrolyzed gas reforming reactor 200 had a length of approximately 3,000 mm and an inner diameter of approximately 400 mm. The inside of the pipe was covered with a heat insulating material, and the pipe was arranged substantially vertically with respect to the gravity direction. The pipe 400 was provided separately from a pipe for introducing the heat carriers 500 from the pyrolyzed gas reforming reactor 200 to the biomass pyrolytic reactor 100. As the heat carriers 500, a substantially spherical alumina sphere having diameter (maximum diameter) of 10 to 12 mm was used.

As the biomass raw material, the same sewage sludge as in Examples was used. The sewage sludge was continuously introduced from a biomass inlet 700 to the biomass pyrolytic reactor 100 held at 550° C. and 0.103 MPa at a rate of 30.0 kg/hour using a quantitative feeder (not shown). The apparent retention time of the sewage sludge in the biomass pyrolytic reactor 100 was approximately 1 hour.

A gas generated by the pyrolysis was obtained from the top portion of the biomass pyrolytic reactor 100 at a rate of 14.7 kg/hour. Then, the gas was introduced into the pyrolyzed gas reforming reactor 200 held at 950° C. and 0.103 MPa. At the same time, superheated steam (180° C., 1 MPa) was introduced from a steam inlet $110_2$ at a rate of 20.0 kg/hr for gas reforming.

A reformed gas at 950° C. was obtained from a reformed gas outlet 800 at a rate of 34.7 kg/hour. Then, the gas was introduced into a gas cooling device (not shown) and brought into contact with water to be cooled to 40° C. The composition of the gas is shown in Table 4.

TABLE 4

| Component | Analysis value |
|---|---|
| $H_2$ | 49.1% by volume |
| CO | 9.4% by volume |
| $CO_2$ | 20.7% by volume |
| $CH_4$ | 17.1% by volume |
| HCL | 0.1% by mass |
| $H_2S$ | 0.4% by mass |
| $N_2$ | 3.2% by mass |

Although the reformed gas was obtained as described above, deposition of tar, as well as diphosphorus pentoxide, potassium, and the like was observed on the pipe 400 for transferring the pyrolyzed gas from the biomass pyrolytic reactor 100 to the pyrolyzed gas reforming reactor 200, and a pipe for discharging the pyrolyzed gas from the pyrolyzed gas reforming reactor 200, i.e., a pipe from the reformed gas outlet 800. Therefore, it is presumed that these pipes may be plugged and corroded during long-term continuous operation.

INDUSTRIAL APPLICABILITY

The biomass gasification device of the present invention makes it possible to: generate a reformed gas having a high content of variable gas such as hydrogen from biomass, preferably biomass having relatively high ash content; prevent plugging and corrosion of a pipe caused by volatilization of diphosphorus pentoxide and potassium contained in ash in the biomass; inhibit generation of $N_2O$; and reduce generation quantities of tar and soot. Therefore, the biomass gasification device of the present invention is expected to be widely used as a gasification device of biomass, particularly biomass having relatively high ash content.

REFERENCE NUMERALS 1 biomass pyrolytic reactor
2 pyrolyzed gas reforming reactor
3 preheater
4 pyrolyzed gas introducing pipe
4-2 gas introduction port (gas outlet) on pyrolyzed gas reforming reactor side of pyrolyzed gas introducing pipe
4-3 gas intake port (gas inlet) on biomass pyrolytic reactor side of pyrolyzed gas introducing pipe
5 plurality of granules and/or lumps (heat carriers)
6 pyrolysis residue (char) discharge port
7 biomass inlet
8 reformed gas outlet
9 waste processing device
$11_1$, $11_2$, $11_3$ steam inlet
12 non-oxidizing gas inlet
13 upper surface of layer of plurality of granules and/or lumps (beat carriers) formed in biomass pyrolytic reactor
$14_1$, $14_2$ air or oxygen introducing pipe
g flow direction of pyrolyzed gas
h height of protrusion of inner bottom face of pyrolyzed gas introducing pipe
$h_1$ width in vertical direction (height) of gas intake port of pyrolyzed gas introducing pipe
$h_2$ width in vertical direction (height) of gas introduction port of pyrolyzed gas introducing pipe
θ inclination angle of protrusion of inner bottom face of pyrolyzed gas introducing pipe
100 biomass pyrolytic reactor
200 pyrolyzed gas reforming reactor
300 preheater
400 pipe for transferring pyrolyzed gas from biomass pyrolytic reactor to pyrolyzed gas reforming reactor
500 plurality of granules and/or lumps (heat carriers)
700 biomass inlet
800 reformed gas outlet
$110_1$, $110_2$ steam inlet

The invention claimed is:

1. A biomass gasification device, comprising:
a biomass pyrolytic reactor comprising a biomass inlet and a non-oxidizing gas inlet and/or a steam inlet;
a pyrolyzed gas reforming reactor comprising a steam inlet and a reformed gas outlet;
a pyrolyzed gas introducing pipe for introducing a pyrolyzed gas generated in the biomass pyrolytic reactor into the pyrolyzed gas reforming reactor, the pyrolyzed gas introducing pipe being provided between the biomass pyrolytic reactor and the pyrolyzed gas reforming reactor,
wherein:
the biomass pyrolytic reactor further comprises an introduction port and a discharge port for a plurality of preheated granules and/or lumps, and performs pyrolysis of biomass by using heat of the plurality of granules and/or lumps; and
the pyrolyzed gas reforming reactor performs steam reforming of the pyrolyzed gas generated by the pyrolysis of the biomass,
the biomass gasification device being characterized in that:
the pyrolyzed gas reforming reactor further comprises an air or oxygen inlet, and performs the steam reforming while partially combusting the pyrolyzed gas generated by the pyrolysis of the biomass by using air or oxygen; and
the pyrolyzed gas introducing pipe is provided on a side surface of the biomass pyrolytic reactor at a level below an upper surface of a layer of the plurality of granules and/or lumps formed in the biomass pyrolytic reactor, wherein an inner bottom face of the pyrolyzed gas introducing pipe comprises a configuration protruding upward.

2. The biomass gasification device according to claim 1, wherein the pyrolyzed gas introducing pipe is provided between the biomass pyrolytic reactor and the pyrolyzed gas reforming reactor to be substantially horizontal with respect to a gravity direction.

3. The biomass gasification device according to claim 1, wherein the configuration protruding upward comprises an inclination from a biomass pyrolytic reactor side to a pyrolyzed gas reforming reactor side.

4. The biomass gasification device according to claim 1, wherein the inner shape of a cross section perpendicular to a longitudinal direction of the pyrolyzed gas introducing pipe is substantially rectangular.

5. The biomass gasification device according to claim 1, wherein one or two pyrolyzed gas introducing pipes are provided.

6. The biomass gasification device according to claim 1, wherein the pyrolyzed gas introducing pipe holds the plurality of granules and/or lumps in inside.

7. The biomass gasification device according to claim 1, wherein the pyrolyzed gas reforming reactor does not comprise a heater.

8. The biomass gasification device according to claim 1, wherein the biomass is a high-ash-content biomass comprising an ash content of 5.0% by mass or more based on dry weight.

9. A method of gasifying biomass, wherein:
a biomass gasification device comprises:
a biomass pyrolytic reactor for heating the biomass under a non-oxidizing gas atmosphere or under a mixed gas atmosphere of a non-oxidizing gas and steam; and
a pyrolyzed gas reforming reactor for reforming a gas generated in the biomass pyrolytic reactor in presence of steam, the method includes:

putting a plurality of preheated granules and/or lumps into the biomass pyrolytic reactor so as to perform pyrolysis of biomass by using heat of the plurality of granules and/or lumps; and then introducing the pyrolyzed gas generated by the pyrolysis of the biomass into the pyrolyzed gas reforming reactor so as to perform steam reforming of the pyrolyzed gas, and wherein:

the pyrolyzed gas generated by the pyrolysis of the biomass is introduced into the pyrolyzed gas reforming reactor through a pyrolyzed gas introducing pipe provided on a side surface at a level below an upper surface of a layer of the plurality of granules and/or lumps formed in the biomass pyrolytic reactor; and then the introduced pyrolyzed gas is partially oxidized by air or oxygen which is separately introduced into the pyrolyzed gas reforming reactor, and at the same time, is reformed by steam which is simultaneously introduced with the air or oxygen, wherein an inner bottom face of the pyrolyzed gas introducing pipe comprises a configuration protruding upward.

10. The biomass gasification method according to claim 9, wherein the pyrolyzed gas introducing pipe is provided between the biomass pyrolytic reactor and the pyrolyzed gas reforming reactor to be substantially horizontal with respect to a gravity direction.

11. The biomass gasification method according to claim 9, wherein the configuration protruding upward comprises an inclination from a biomass pyrolytic reactor side to a pyrolyzed gas reforming reactor side.

12. The biomass gasification method according to claim 9, wherein the pyrolyzed gas introducing pipe holds the plurality of granules and/or lumps in inside.

13. The biomass gasification method according to claim 9, wherein the biomass is a high-ash-content biomass comprising an ash content of 5.0% by mass or more based on dry weight.

* * * * *